US011501776B2

(12) United States Patent
Wei

(10) Patent No.: US 11,501,776 B2
(45) Date of Patent: Nov. 15, 2022

(54) METHODS AND SYSTEMS FOR FACILITATING ACCOMPLISHING TASKS BASED ON A NATURAL LANGUAGE CONVERSATION

(71) Applicant: An Wei, San Jose, CA (US)

(72) Inventor: An Wei, San Jose, CA (US)

(73) Assignee: KOSMOS AI TECH INC, San Jose, CA (US)

( * ) Notice: Subject to any disclaimer, the term of this patent is extended or adjusted under 35 U.S.C. 154(b) by 116 days.

(21) Appl. No.: 17/149,403

(22) Filed: Jan. 14, 2021

(65) Prior Publication Data

US 2021/0217418 A1 Jul. 15, 2021

Related U.S. Application Data

(60) Provisional application No. 62/960,895, filed on Jan. 14, 2020.

(51) Int. Cl.
*G10L 15/22* (2006.01)
*G06N 5/04* (2006.01)
*G10L 15/18* (2013.01)

(52) U.S. Cl.
CPC ............ *G10L 15/22* (2013.01); *G06N 5/041* (2013.01); *G10L 15/1815* (2013.01); *G10L 2015/223* (2013.01)

(58) Field of Classification Search
CPC ............... G10L 15/22; G10L 15/1815; G10L 2015/223; G06N 5/041; G06N 7/005; G06N 5/022; G06N 5/042; G06N 5/046; G06F 40/216; G06F 40/279; G06F 40/35
See application file for complete search history.

(56) References Cited

U.S. PATENT DOCUMENTS

| 2020/0004878 A1* | 1/2020 | Beaumont | G06F 16/685 |
| 2020/0066255 A1* | 2/2020 | Madan | G10L 15/197 |
| 2020/0258509 A1* | 8/2020 | Bharadwaj | G10L 15/22 |
| 2021/0050006 A1* | 2/2021 | Andreas | G06F 40/30 |

* cited by examiner

*Primary Examiner* — Abul K Azad

(57) ABSTRACT

Disclosed herein is a system for facilitating accomplishing tasks based on a natural language conversation. Accordingly, the system may include a direct graph unit. Further, the direct graph unit may include a directed graph. Further, the directed graph models a non-linearity of the natural language conversation. Further, the directed graph may include a set of nodes connected by at least one edge. Further, the system may include a context-encoded language understanding unit may include a learning unit and an inferring unit. Further, the learning unit may be configured for receiving a plurality of inputs. Further, the learning unit may be configured for generating a model based on the plurality of inputs. Further, the inferring unit may be configured for receiving a plurality of inputs. Further, the inferring unit may be configured for generating an output based on the plurality of inputs and the model.

20 Claims, 23 Drawing Sheets

METHODS AND SYSTEMS FOR FACILITATING ACCOMPLISHING TASKS BASED ON A NATURAL LANGUAGE CONVERSATION

The current application claims a priority to the U.S. Provisional Patent application Ser. No. 62/960,895 filed on Jan. 14, 2020.

FIELD OF THE INVENTION

Generally, the present disclosure relates to the field of data processing. More specifically, the present disclosure relates to methods and systems for facilitating accomplishing tasks based on a natural language conversation.

BACKGROUND OF THE INVENTION

Natural Language Conversation is the most robust, universal, ubiquitous, and expressive way for people to communicate with machines. Natural Language Conversation also breaks the barrier of geography, literacy, language, and affordability. Natural Language Conversation is the most intuitive and engaging way for a future enterprise to communicate with its employees, customers, suppliers, and partners.

Existing systems today model conversations in one of or a combination of three simplistic and linear models—Tree, Flow, and Slot. All three formats model the natural conversation into a linear and deterministic representation. For this type of simplistic conversational models to work, it relies on three assumptions (1) users corporate with the system and follows its lead accordingly; (2) the accuracy of every component is sufficiently high; (3) interactions follow a simple pattern that could be modeled by simple formats. But the above assumptions are frequently not met in real-world scenarios, therefore the application of the existing systems is limited to the simple, shallow, and highly constrained use cases.

Therefore, there is a need for improved methods and systems for facilitating accomplishing tasks based on a natural language conversation that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a system for facilitating accomplishing tasks based on a natural language conversation, in accordance with some embodiments. Accordingly, the system may include a direct graph unit may include a directed graph. Further, the directed graph models a non-linearity of the natural language conversation. Further, the directed graph may include a set of nodes connected by at least one edge. Further, the directed graph represents a conversation model of a specific domain. Further, each node of the set of nodes represents a state associated with a plurality of types. Further, the plurality of types may include an intent, action, and expect. Further, the intent represents a state after a human utterance. Further, the action represents an activity that the system takes based on a probabilistic assessment of a current state. Further, the expect represents a state after a machine utterance. Further, the system may include a context-encoded language understanding unit may include a learning unit and an inferring unit. Further, the learning unit may be configured for receiving a plurality of inputs. Further, the plurality of inputs may include a plurality of processing results of a plurality of previous utterances, a plurality of system's previous responses, and a current utterance with at least one of an annotation and contextual information associated with the current utterance. Further, the learning unit may be configured for generating a model based on the plurality of inputs. Further, the inferring unit may be configured for receiving a plurality of inputs. Further, the plurality of inputs may include a plurality of processing results of a plurality of previous utterances, a plurality of system's previous responses, and a current utterance with at least one of an annotation and contextual information associated with the current utterance. Further, the inferring unit may be configured for generating an output based on the plurality of inputs and the model. Further, the output may include a probabilistic prediction on a next state in the conversation model. Further, the conversation model may be configured for accomplishing the tasks based on the probabilistic prediction of the next state.

Further disclosed herein is a system for facilitating accomplishing tasks based on a natural language conversation, in accordance with some embodiments. Accordingly, the system may include a direct graph unit may include a directed graph. Further, the directed graph models a non-linearity of the natural language conversation. Further, the directed graph may include a set of nodes connected by at least one edge. Further, the directed graph represents a conversation model of a specific domain. Further, each node of the set of nodes represents a state associated with a plurality of types. Further, the plurality of types may include an intent, action, and expect. Further, the intent represents a state after a human utterance. Further, the action represents an activity that the system takes based on a probabilistic assessment of a current state. Further, the expect represents a state after a machine utterance. Further, the system may include a context-encoded language understanding unit may include a learning unit and an inferring unit. Further, the learning unit may be configured for receiving a plurality of inputs. Further, the plurality of inputs may include a plurality of processing results of a plurality of previous utterances, a plurality of system's previous responses, and a current utterance with at least one of an annotation and contextual information associated with the current utterance. Further, the learning unit may be configured for generating a model based on the plurality of inputs. Further, the inferring unit may be configured for receiving a plurality of inputs. Further, the plurality of inputs may include a plurality of processing results of a plurality of previous utterances, a plurality of system's previous responses, and a current utterance with at least one of an annotation and contextual information associated with the current utterance. Further, the inferring unit may be configured for generating an output based on the plurality of inputs and the model. Further, the output may include a probabilistic prediction on a next state in the conversation model. Further, the conversation model may be configured for accomplishing the tasks based on the probabilistic prediction of the next state. Further, the system may include a multi-hypothesis unit configured for implementing a multi-hypothesis processing method. Further, the multi-hypothesis processing method carries a compositional multi-hypothesis along an entire processing pipeline associated with the system in order to cope with a probabilistic nature of the natural language conversation. Further, the accomplishing of the tasks may be further based on the implementing of the multi-hypothesis processing method. Further, the multi-hypothesis processing method makes a plurality of probabilistic hypotheses on the current state using at least one information that may include the conversational model, a plurality of detected states, and a plurality of inferred states. Further, the accomplishing of the tasks may be further based on the plurality of probabilistic hypotheses.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
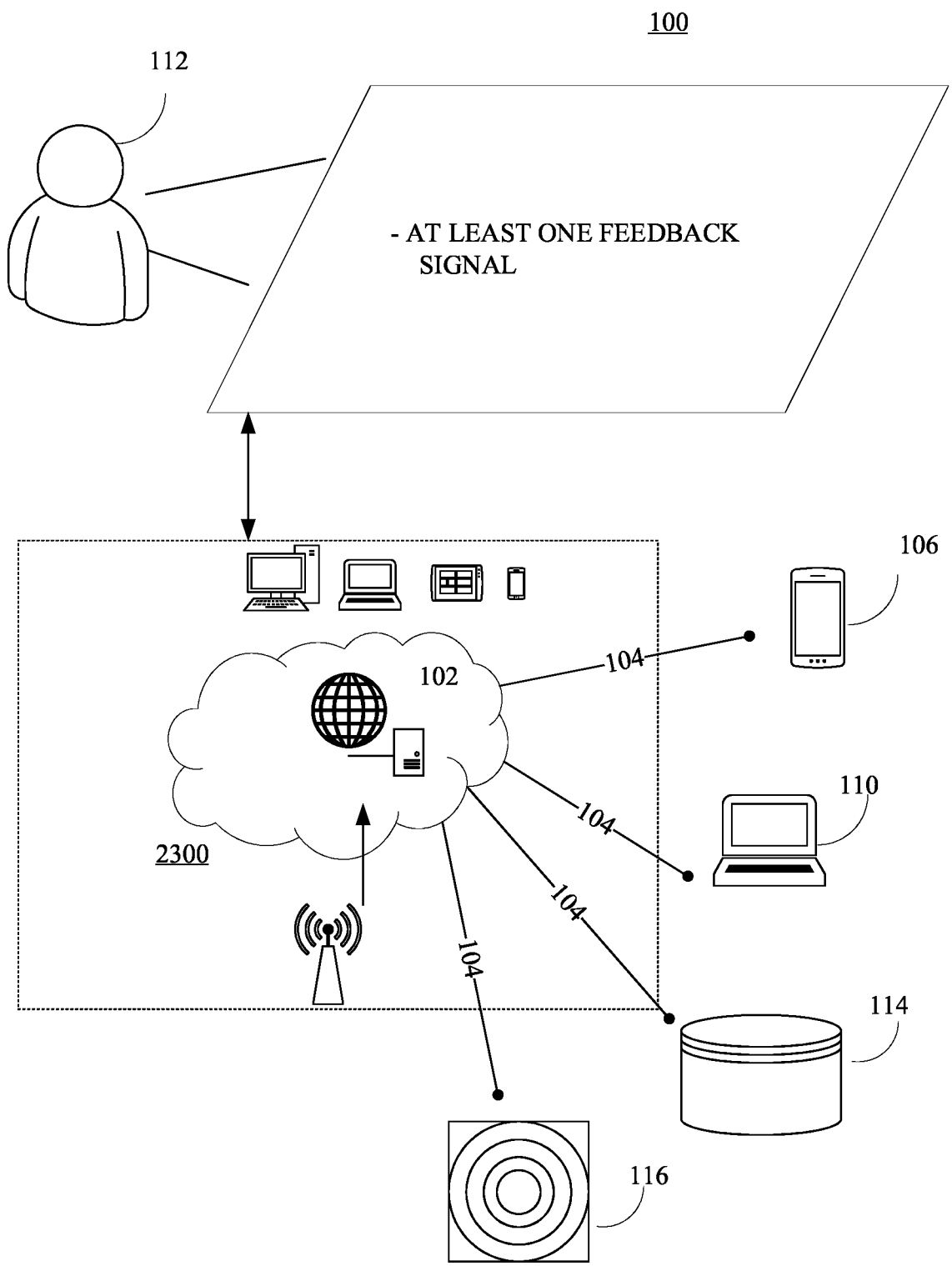
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods and systems for facilitating accomplishing tasks based on a natural language conversation, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smart-card with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, physical state and/or physiological state and/or psychological state of the user, and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes methods and systems for facilitating accomplishing tasks based on a natural language conversation. The disclosed system may be configured for modeling, training, and generating deep natural language conversation to accomplish complex tasks.

In a typical human conversation, context plays a critical role. Without context, it is impossible to achieve the depth and richness that humans are accustomed to. The semantic understanding of utterance depends not only on what has been said (intra-speaker and inter-speaker) but also on the overall conversation state in the context matrix. Further, the disclosed system may be configured for encoding rich context information into natural language understanding and leverage context information to drive deep and meaningful conversation between humans and machines, and reduce the ambiguity of natural language conversations.

Further, flexibility and adaptability associated with the Natural Language Conversation have the potential to combine siloed information into one universal interface to provide convenience to the end consumers. Natural Language Conversation is the most intuitive and engaging way for a future enterprise to communicate with its employees, customers, suppliers, and partners. The rapid advances in technology have resulted in the system's capability to better understand people out of complex language and context and be able to extract critical information, determine the semantic meaning, and drive deep interactions to accomplish complex tasks.

Further, existing systems today model conversations in one of or a combination of three simplistic and linear models—Tree, Flow, and Slot. All three formats model the natural conversation into a linear and deterministic representation. For this type of simplistic conversational models to work, it relies on three assumptions (1) users corporate with the system and follows its lead accordingly; (2) the accuracy of every component is sufficiently high; (3) interactions follow a simple pattern that could be modeled by simple formats. But the above assumptions are frequently not met in real-world scenarios, therefore the application of the existing systems is limited to the simple, shallow, and highly constrained use cases.

The disclosed system may be configured for combining graph theory with machine learning to train nonlinear conversation models that may be capable of accomplishing very complex tasks. Further, in an exemplary embodiment, the disclosed system may include Neural-Symbolic Machine for Deep Conversation.

In an embodiment, the disclosed system may include a direct graph unit (or directed graph unit) that may be used to model natural language conversation with a set of contexts, the representation of the graph can either be learned from natural conversation data or manually inputted as prior domain knowledge. Further, the Directed Graph may model the non-linearity of natural language conversation. Further, the disclosed system may be associated with a context-encoded language understanding algorithm that learns the semantic meaning of natural language from not only the utterance but also the contextual information that includes sequential context, inter-speaker context, intra-speaker context, and other contextual information. Further, the disclosed system may include a compositional processing unit that iteratively processes sub-phrases of the utterance, an extensible state management unit that could detect, manage and infer states for conversation, a semantic frame unit that constructs extracted information into persistent memory. Further, the disclosed system may be associated with a multi-hypothesis processing method that carries multiple hypotheses on the current state from probabilistic results generated from components along the processing pipeline and the state information accumulated during a conversation. Further, the disclosed system may include an anticipatory processing unit that may be used to predict future interactions based on existing context information and a graph-based conversational model. Further, the disclosed system may be associated with a continuous learning unit that takes feedback (or signal) from instructor and user to continuously refine the model for better results in the future.

Further, the disclosed system may be configured for modeling, training, and generating natural language conversations to accomplish complex tasks. Further, the context-encoded natural language understanding algorithm may train language understanding from context-rich conversation data into a graph-based model and process natural language interaction based on the rich context. Further, the compositional processing unit divides the input into multiple sub-phases and merge the results after processing. Further, the multi-hypothesis unit generates multiple probabilistic hypotheses and keeps track of a combination of probabilistic results to be used in both language understanding and dialogue management. Further, the extensible state management unit allows plug-ins to infer additional states given detected states from processed information. Further, the semantic frame unit may use distributed and structural ways to represent detected and inferred states in both long-term and short-term persistence. Further, the anticipatory processing unit may generate a prediction of next interactions based on the graph-based conversational model and assessment of current states.

Further, the Directed Graph part may be configured into a set of nodes connected by edges. Each graph may represent a conversational model, typically, of a specific domain. Each node in the graph may represent a state, that may have three types, Intent, Action, Expect. An intent represents the state after the human utterance, Action represents the activity that the disclosed system takes based on probabilistic assessment of the current state, and Expect represents the state after machine utterance. Further, the Directed Graph model may serve as a generic and non-linear approach to model a wide range of conversations.

Further, the context-encoded language understanding unit may be configured into two parts, learning unit, and inferring unit. The learning unit may take multiple inputs: processing results of previous utterances, the disclosed system's previous responses, a current utterance with annotation, and other contextual information that may include personal and environmental information. The result of the learning unit is a model that can be used by the inferring unit. The inferring unit, when serving, may take multiple inputs: processing results of previous utterances, system's previous response, current utterance, and other contextual information that may include personal and environmental information. The output of inferring is the probabilistic prediction of the next state in the graph-based conversation model.

Further, the compositional processing unit may be configured into a process that iteratively processes the utterances with two basic operations: divide and merge. The divide sub-process may try to divide utterance (which could be a single sentence or multiple sentences) into sub-phases that may be individually processed. The divide sub-process may result in logic between sub-phrases that can be later used by the merge sub-process. The sub-process may take the processing result of sub-phrases and merge the processing results into consolidated results in uniform representation.

The extensible state management unit may be configured into detected states and inferred states. The detected states may be used to store processing results of utterance parsing and any information that can be used in driving conversation. The inferred states may be used to store states from multiple inputs that may include detected states and other hidden states. Plug-in module named inferred may be added and configured to generate inferred states. The representation of both detected states and inferred states may be represented consistently in a semantic frame format.

The semantic frame unit may be configured into structured representation (may include distributed, graph, and tree) of processed results. The representation (or structured) carries a semantic meaning that may be expressed in numeric distance calculated from distributed representation and/or structural distance calculated from graph/tree representation. The representation may be used by other units in reasoning, inferring the states of conversation, identifying appropriate responses or actions, and executing identified actions with proper parameters. The semantic frame may be persistent in long-term and short-term memory.

Further, the multi-hypothesis unit may be a processing method that carries compositional multi-hypothesis along the entire processing pipeline in order to cope with the probabilistic nature of the natural language of conversation. The multi-hypothesis process makes probabilistic hypotheses on the current state using all the information available, that may include the graph-based conversational model, detected states, and inferred state. The management of multi-hypothesis may be configured into a forward pass and backward pass. The forward pass may be a process to generate hypotheses (each route with probabilistic) by model learned from data, predefined rules, and states. The backward pass may be a process to determine the best hypothesis by a model of knowledge and fact. Both the forward pass and the backward pass may be iterative and triggered by any unit along the processing pipeline.

The anticipatory processing unit may be configured to generate a probabilistic prediction on the next interactions using the conversation model, historical data, and hypotheses of the current state. It is used to narrow the search space of the next processing and increase precision by reducing the ambiguity. The anticipatory process may be iterative and triggered by any unit along the processing pipeline.

The continuous learning unit may be configured to take feedback signals from users (the consumers of the system) and instructors (the administrators of the system) to continuously refine the disclosed system for better results in the future. The feedback signal (or feedback) may be a combination of multiple formats that may include annotation of a sequence of utterances, list choice of suggestions, and survey results.

Further, a human has the superior capability to process the natural language, extract relevant information, infer the meaning, and generate a proper response in natural conversation. Further, the human may distinguish the nuance of language utterance and associate understanding to different entities or concepts in a distinct context. Further, the human may also solve the ambiguity of words and sentences by bringing the context into understanding. Further, the human may be capable of running multiple hypotheses sequentially or parallelly to get the best understanding result. Further, the human can apply logic in both language processing and reasoning in terms of compositional analysis and decision making. More importantly, the human can learn efficiently on the new scenarios by a very small size of samples, and continuously improve along with experience. This continuous learning can be triggered and motivated by internal and external signals.

Natural Language is compositional. Articles may be divided into paragraphs, which can be further divided into sentences, that consist of phrases and sub-phrases. This process can go on and on till the smallest of language process, a token which usually refers to words or characters in some languages. And logic exists in the composition of language. Some of these logics are explicit, such as "A and B" might mean a union, "A or B" might mean a choice. Some of these logics are more implicit, such as "I like A and B, but I can only choose one". Some of these logics are conditional, such as "Please book a restaurant with outdoor seating if the weather is sunny". Some of these logics are sequential, such as "Please send an email after the machine is ready."

In the compositional processing unit, there may exist two basic operations, divide and merge. The divide operation divides a complex language into a hierarchical representation, maybe tree structure, the leaf node of which the basic units for natural language processing while all the rest nodes contain a logic among its children nodes. The merge operation, when the processing result comes back, uses the logic to generate a compositional result for language processing.

Natural Language Conversation may be within a context that takes multiple sources as input. The examples of context input may be previously said utterance, system's response, personal profile, an environment where the conversation happens, and other situations such as calendar, meeting schedule, communication in other channels, etc. All or part of that information may be embedded into the learning process which will result in a model that could be used, in inferring unit, to predict the language understanding, given proper format and encoding of contextual information.

Both the learning and the inferring units may not use rules during the processing but solely rely on the data and probabilistic model to get the result. This approach is much more scalable and flexible to cope with the complex environment that natural conversation systems could encounter.

One of the keys to intelligence is the representation of information. Further, the processing result may be represented in a distributed format (vector) and structural format (graph and tree). For example, the location of "Palo Alto" is represented into a 300-dimensional vector which is then associated with "departing location" under the parent node "location", which is further linked with multiple intents "book flight", "book hotel" and "check the weather", etc.

This information representation may be used to easily map to knowledge representation which is usually in distributed format and/or structural format. The appropriate mapping may be used in multiple NLP tasks such as question answering, inferring the additional states, reasoning, etc.

Further, the disclosed system may employ machine learning in all processing units which generate probabilistic models as a result. The Multi-hypothesis unit keeps track of multiple probabilities and determines the best results along the processing pipeline or at the end of it. For example, "I need to go to San Jose tomorrow @ 3 pm." It could mean that the person wants to book a taxi, or set a reminder, or reserve a flight, with probabilistic. And San Jose could mean the city in Silicon Valley or the capital of Costa Rica. The multi-path unit carries and tracks the combination of all the possible results along the process. All the other units may contribute additional information to help determine the best result given available information and facts. For example, if the person is currently located in Silicon Valley, the chance he or she means the city in Silicon Valley gains a much higher probability. Then the intention to book a flight becomes a much lower probability.

The scale of multi-hypothesis could be huge due to the combination and degrade the efficiency. Therefore, the disclosed system may employ a machine learning mechanism to learn the model to generate only relevant hypotheses with a reasonable confidence threshold. Further, the disclosed system may employ multiple mechanisms to limit the scale of multi-path and improve efficiency. Further, the first one may be to have a threshold to trim the probabilistic at an early stage. Further, a second one may be to trim the probabilistic at every step, therefore, each step may trim the hypothesis first then expand the hypothesis, given the processing result. Further, a third one may be to have a size limit on the number of hypotheses.

One of the difficulties of Natural Language Conversation is the combinatorial problem, tens of characters can form into hundreds of thousands of words, which can further turn into millions of phrases, billions of sentences, and a countless number of paragraphs and articles. It is impossible to exhaust the possibilities of utterance, therefore the capability of continuous learning is extremely important. In our system, the continuous learning unit may take feedback signals from the user and/or instructor. The feedback may be binary, choice, sentimental, annotation, or a combination of multiple. Further, binary feedback could be "yes/no" if the system is not very certain of the result and asks for confirmation. Further, choice feedback may be the user's input by being given multiple choices. Further, sentimental feedback may be the sentimental analysis of the user's response in reaction to prompt response. Further, annotation feedback could be user-directed like "by Beijing, I meant departure location" or instructor-initiated like creating a label of dept-loc for Beijing as an additional example to the training.

Another important aspect of Natural Language Conversation is partial observability. Not all the critical information to understand conversation is presented in language. Quite often, the result of understanding is tightly associated with the information outside of language itself. For example, "I need a taxi to San Jose @ 3 pm", implies that the starting point is wherever I will be then. The disclosed system may generate inquiries for clarification in terms of ambiguity. It may also use the other information source to infer the missing information. Given the situation, if the probabilistic of inferred information is high enough, the disclosed system may add this additional information into the extensible state management unit the result of that may be used in the next unit to determine the appropriate actions to take.

Further, the disclosed system may be configured for generating a universal representation of conversation in Graph with 4 types of nodes (i.e., the four basic elements for conversation)—Context, Action, Intent, Expect, and connections among nodes to represent conversation in any arbitrary complexity. Further, the context node represents the task/topic that the conversation is in, the intent node represents what user's utterance, the expect node represents the system's utterance, the action node represents the mechanism (source) to generate the system's utterance. Further, the context-encoded NLU algorithm may learn the NLP tasks from not only the utterance but also the contextual information from the previous user's utterances, system's response, and other contextual information. Further, the context-encoded NLU may be trained with graph representation of data that has rich context information. Further, the disclosed system may be associated with a multi-path processing method that generates multiple hypotheses on where the conversation should land within the Graph representation of conversation, and use those multiple hypotheses in context-encoded NLU to generate a probabilistic matrix from where the best decision is made on the final result.

Further, in an embodiment, the disclosed system may be configured for a universal representation of conversation in the Directed Graph with 4 types of nodes (i.e., the four basic elements for conversation)—Context, Action, Intent, Expect, and 5 types of connections among nodes to represent conversation in any arbitrary complexity.

Further, Natural language conversation may be modeled in multiple ways. The commonly used models are a tree, slot, flow, or a combination of three. However, those models are limited by their expressiveness. Further, the disclosed system may use the Directed Graph to model the natural language conversations between user and system.

The graph consists of 4 types of nodes connected by 5 types of connections.

Further, the 4 types of nodes may include the context that may be used to model the condition in which the user says. Further, the 4 types of nodes may include context that may be used to model the topic/task. Further, the 4 types of nodes may include intent that may be used to model the meaning of what the user says. Further, the 4 types of nodes may include an action that may be used to model the condition in which the system says. Further, the 4 types of nodes may include expect that may be used to model the meaning of what the system says.

The nodes are connected with 5 types of connections:
(1) UserUtterance, from context, expect to intent, is used to model what the user says;
(2) SystemUtterance, from action to expect, is used to model what the system says;
(3) ActionPlan, from intent to action, is used to model the reaction from what the user says to what the system should respond;
(4) ActionChain is used to link multiple actions together, so firing one action will trigger multiple actions;
(5) IntentConcat is to link multiple intents together, so firing one intent will trigger multiple intents to function;

Further, the directed graph model may represent arbitrarily complex conversation. Therefore, It is a universal representation of natural language conversation. The other commonly used models for natural conversations, like Flow, Tree, Slot, can all be easily represented in this format of Directed Graph.

Further, the Dialog Management—transition (control) of conversation—with the disclosed system is done with states. The transition may be learned, given the appropriate format of data. In learning, it is sequential learning to learn the transition from intent to action and action to expect. The other way for transition is via soft logic. A typical soft logic used in the system looks like the following:

"[failed_number]<2 AND ([device_type]="lock" OR [called_back]=true)"

Where H encompass the state. The soft logic can be nested.

Further, the soft logic is defined in the connections. Further, the disclosed system may be associated with a soft logic builder that may help developers to build complex soft logic with simple clicks.

The dialog management may be a hybrid model, meaning learned with soft logic in weak supervision.

States are very important for the Directed Graph to control the conversation, either by learned sequential models or soft logic. Therefore, flexibly managing the states is critical. In this model, each node can add/update/delete states. When the node is triggered (fired) in a conversation, if the node has set to change the states, the states will be changed accordingly. The following transition will be done with the new states.

Further, the context-encoded NLU algorithm may learn the NLP tasks from not only the utterance but also the contextual information from the previous user's utterances, system's response, and other contextual information. Further, the context-encoded NLU may be trained with Graph representation of data that contains rich context information.

Unlike vanilla NLU that is trained in a flat structure of the text to class mapping, the NLU used with the Directed Graph is trained and executed with richer information.

The parsing of vanilla NLU solely depends on the text input, as the training data is flat structured. In the Directed Graph, data is represented inside the graph, therefore the data has much richer information than the systems that are trained on flatted structured data. In our system, the understanding of user input depends on not only the text input but also the position in the graph where the interaction is deemed to be. The training data carries the structure of the graph, therefore the NLU needs to be trained differently. Further, the context encoded NLU may be trained with text, context, expect and other arbitrary information encoded together.

Further, an encoder associated with the disclosed system may have multiple choices, weighted addition, multiplication, product, concatenation, or a combination of multiple methods. The choice of encoder depends on the balance of two things: how well it isolates different contexts (context bias) and how it generalizes within a context (generalization). Further, it was found they form a trade-off. The optimal method may be explored by parallel training.

The same context-encoding technology may be used in multiple tasks. Without changing the architect, the same algorithm can be used in sentiment analysis, entity detection, outlier detection, and many others. Those tasks are all context-sensitive.

The benefit of the context encoded NLU may be that it can differentiate the nuance of the same text in different context settings. This means, when the same text is put in different positions of the graph, it will have different interpretations with different confidence scores. Given the right training algorithm, the confidence score can approximately represent how likely the result is true. Further, confidence scores are used to determine where the conversation should be in the graph.

The context-encoded NLU gives us a way to differentiate the understanding of the same text in different contexts. This technology-enabled another invention of us, using multiple hypotheses to further enhance the understanding within complex conversation settings.

In multiple-hypotheses, the disclosed system makes several hypotheses based on previous interactions. Each hypothesis is a representation of a position in the graph, meaning where the conversation could be. Further, the NLU may analyze those multiple hypotheses, using context-encoded NLU, in parallel. The output of each hypothesis may be a list of candidates each with a confidence score. Further, the confidence scores may be adjusted by context bias—a score represents how likely the hypothesis is. Further, an engine may pick the best result with the highest adjusted confidence score, from all the candidates.

The number of hypotheses is theoretically unlimited but practically restrained by the computation resources and the real-time requirement of the applications.

The context bias, the measure of the likelihood of each hypothesis, may be learned or programmed. To learn, the disclosed system learns the sequential prediction of the next context given the existing contexts. To program, the mechanism may be to look back in the previous interactions, choose possible contexts, and assign the closer context with a higher context bias score.

Referring now to figures, FIG. 1 is an illustration of an online platform 100 consistent with various embodiments of the present disclosure. By way of non-limiting example, the online platform 100 to facilitate accomplishing tasks based on a natural language conversation may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114, and sensors 116 over a communication network 104, such as, but not limited to, the Internet. Further, users of the online platform 100 may include relevant parties such as, but not limited to, end-users, administrators, service providers, service consumers and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 2300.

Figure 2:
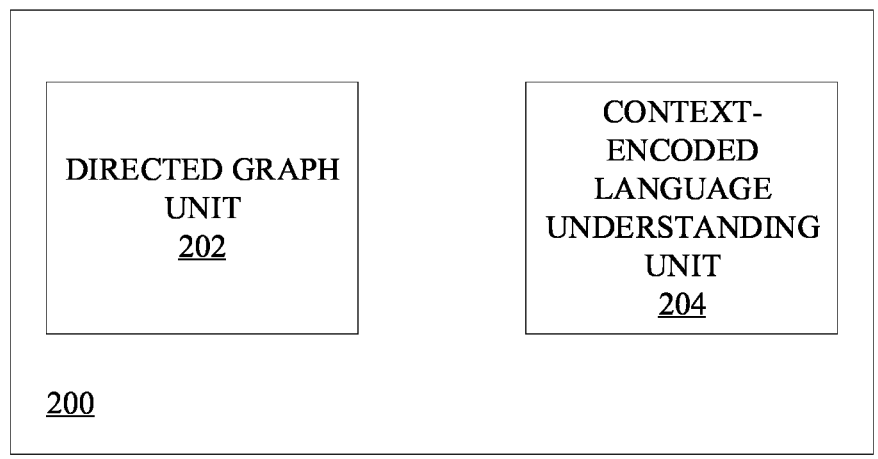
FIG. 2 is a block diagram of a system for facilitating accomplishing tasks based on a natural language conversation, in accordance with some embodiments.

FIG. 2 is a block diagram of a system 200 for facilitating accomplishing tasks based on a natural language conversation, in accordance with some embodiments. Accordingly, the system 200 may include a direct graph unit 202. Further, the direct graph unit 202 may include a directed graph. Further, the directed graph models a non-linearity of the natural language conversation. Further, the directed graph may include a set of nodes connected by at least one edge. Further, the directed graph represents a conversation model of a specific domain. Further, each node of the set of nodes represents a state associated with a plurality of types. Further, the plurality of types may include an intent, action, and expect. Further, the intent represents a state after a human utterance. Further, the action represents an activity that the system 200 takes based on a probabilistic assessment of a current state. Further, the expect represents a state after a machine utterance.

Further, the system 200 may include a context-encoded language understanding unit 204. Further, the context-encoded language understanding unit 204 may include a learning unit and an inferring unit. Further, the learning unit may be configured for receiving a plurality of inputs. Further, the plurality of inputs may include a plurality of processing results of a plurality of previous utterances, a plurality of system's previous responses, and a current utterance with at least one of an annotation and contextual information associated with the current utterance. Further, the learning unit may be configured for generating a model based on the plurality of inputs. Further, the inferring unit may be configured for receiving a plurality of inputs. Further, the plurality of inputs may include a plurality of processing results of a plurality of previous utterances, a plurality of system's previous responses, and a current utterance with at least one of an annotation and contextual information associated with the current utterance. Further, the inferring unit may be configured for generating an output based on the plurality of inputs and the model. Further, the output may include a probabilistic prediction on a next state in the conversation model. Further, the conversation model may be configured for accomplishing the tasks based on the probabilistic prediction of the next state.

Further, in some embodiments, the direct graph unit 202 may be configured for modeling the natural language conversation with a set of contexts. Further, the direct graph unit 202 may be configured for generating the directed graph based on the modeling. Further, the accomplishing of the tasks may be based on the generating of the directed graph.

Figure 3:
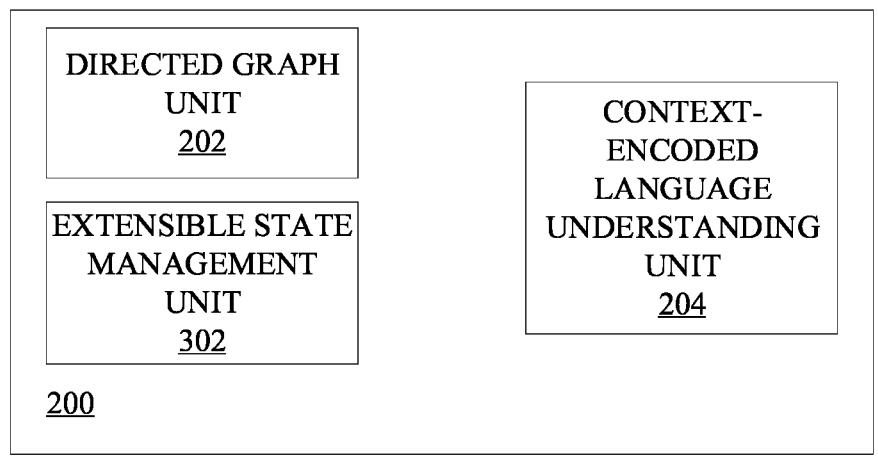
FIG. 3 is a block diagram of the system for facilitating accomplishing the tasks based on the natural language conversation, in accordance with some embodiments.

Further, in some embodiments, the system 200 may include an extensible state management unit 302 (as shown in FIG. 3). Further, the extensible state management unit 302 may include a plurality of detected states and a plurality of inferred states. Further, the plurality of detected states may be configured for storing a plurality of processing results of a plurality of utterances parsing. Further, the plurality of utterances drives the natural language conversation. Further, the plurality of inferred states may be configured for storing a plurality of states from the plurality of inputs that may include the plurality of detected states and a plurality of hidden states. Further, the accomplishing of the tasks may be based on the storing of the plurality of processing results and the storing of the plurality of states.

Figure 4:
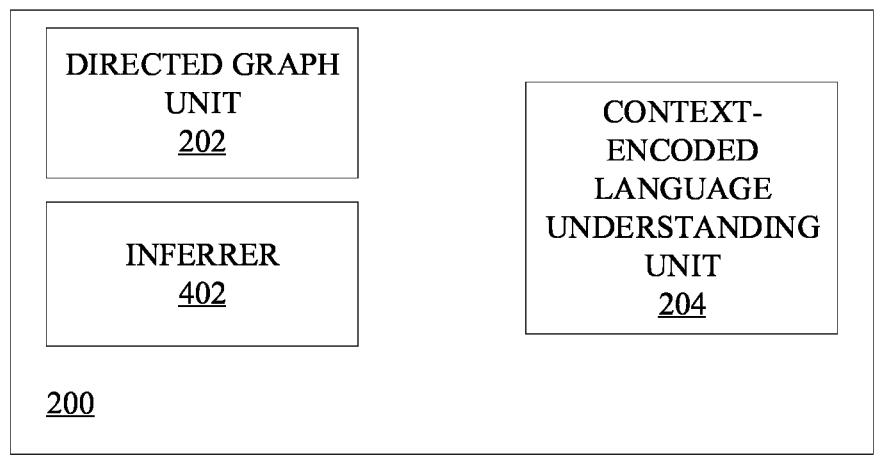
FIG. 4 is a block diagram of the system for facilitating accomplishing the tasks based on the natural language conversation, in accordance with some embodiments.

Further, in some embodiments, the system 200 may include an inferrer 402 (as shown in FIG. 4) configured to be added to the extensible state management unit 302. Further, the inferrer 402 may be a plug-in-module. Further, the inferrer 402 may be configured for generating the plurality of inferred states. Further, the accomplishing of the tasks may be based on the generating the plurality of inferred states.

Further, in some embodiments, each of the plurality of detected states and the plurality of inferred states may include a plurality of representations representing each of the plurality of detected states and the plurality of inferred states in a semantic frame format.

Figure 5:
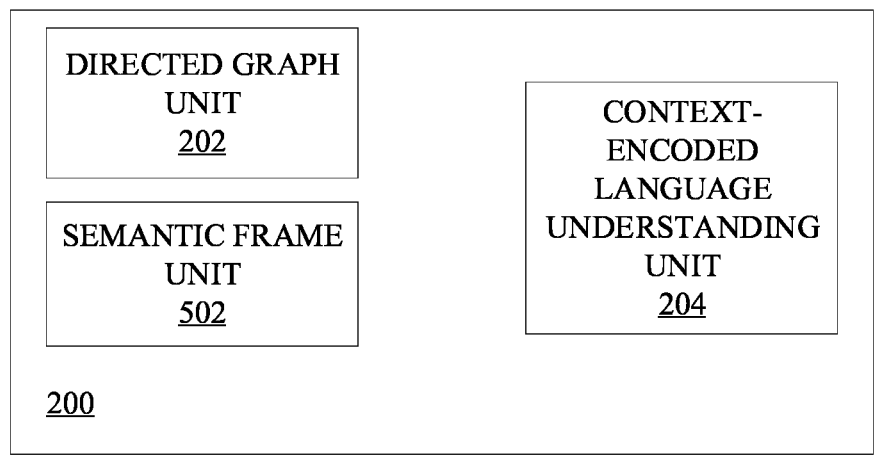
FIG. 5 is a block diagram of the system for facilitating accomplishing the tasks based on the natural language conversation, in accordance with some embodiments.

Further, in some embodiments, the system 200 may include a semantic frame unit 502 (as shown in FIG. 5). Further, the semantic frame unit 502 may include a plurality of structured representations of a plurality of processed results. Further, the plurality of structured representations may include a distributed representation, a graph representation, and a tree representation. Further, the plurality of structured representations carries a semantic meaning. Further, the semantic meaning may be expressed in a numeric distance calculated from the distributed representation. Further, the accomplishing of the tasks may be based on the semantic meaning.

Further, in some embodiments, the semantic meaning may be expressed in a structural distance calculated from at least one of the graph representation and the tree representation.

Further, in some embodiments, the plurality of structured representations may be configured to be used by a plurality of units in at least one of reasoning and inferring a plurality of states associated with the natural language conversation, identifying at least one of at least one appropriate response and at least one appropriate action, and executing a plurality of identified actions with proper parameters. Further, the accomplishing of the tasks may be based on the at least one of the reasoning and the inferring, the identifying, and the executing.

Figure 6:
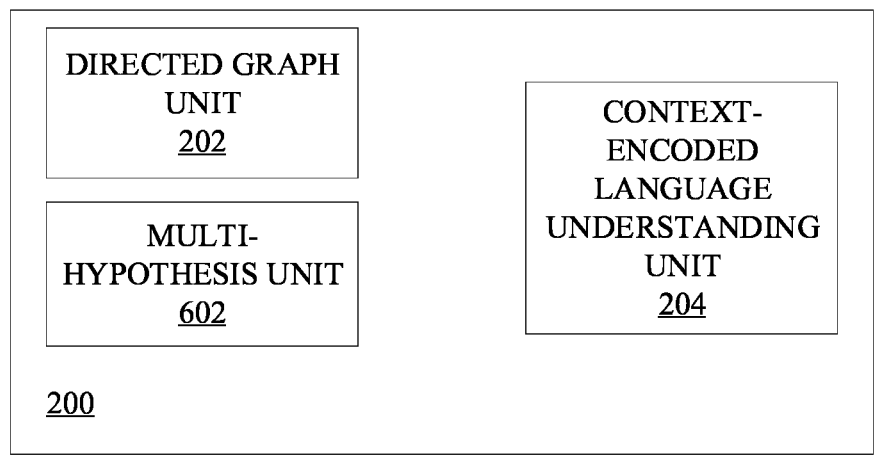
FIG. 6 is a block diagram of the system for facilitating accomplishing the tasks based on the natural language conversation, in accordance with some embodiments.

Further, in some embodiments, the system 200 may include a multi-hypothesis unit 602 (as shown in FIG. 6) configured for implementing a multi-hypothesis processing method. Further, the multi-hypothesis processing method carries a compositional multi-hypothesis along an entire processing pipeline associated with the system 200 in order to cope with a probabilistic nature of the natural language conversation. Further, the accomplishing of the tasks may be based on the implementing of the multi-hypothesis processing method.

Further, in some embodiments, the multi-hypothesis processing method makes a plurality of probabilistic hypotheses on the current state using at least one information that may include the conversational model, a plurality of detected states, and a plurality of inferred states. Further, the accomplishing of the tasks may be based on the plurality of probabilistic hypotheses.

Figure 7:
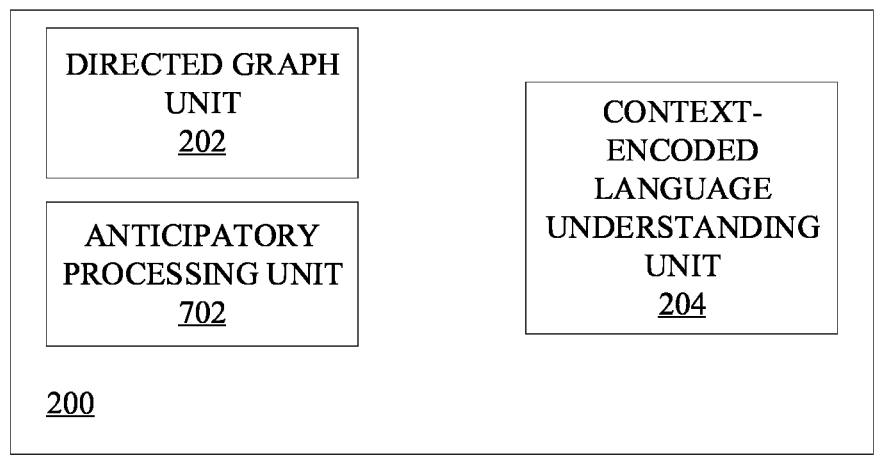
FIG. 7 is a block diagram of the system for facilitating accomplishing the tasks based on the natural language conversation, in accordance with some embodiments.

Further, in some embodiments, the system 200 may include an anticipatory processing unit 702 (as shown in FIG. 7) configured for generating the probabilistic prediction on a plurality of next interactions using the conversation model, historical data, and a plurality of hypotheses of the current state. Further, the accomplishing of the tasks may be based on the generating of the probabilistic prediction on the plurality of next interactions.

Figure 8:
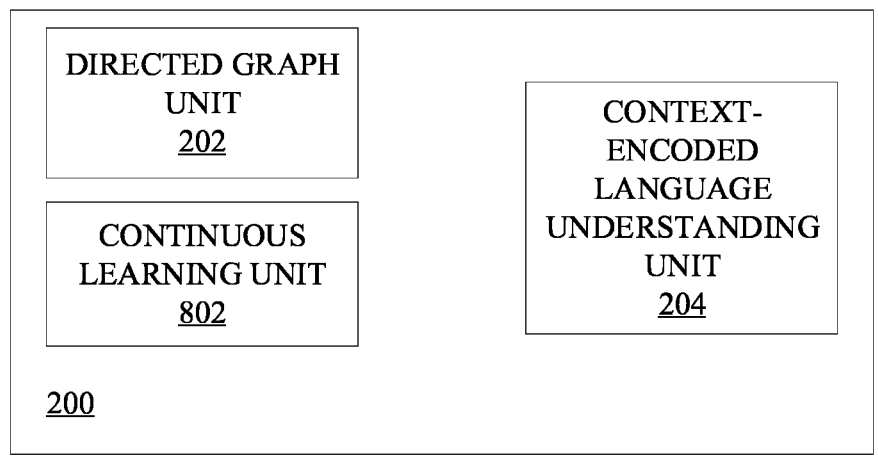
FIG. 8 is a block diagram of the system for facilitating accomplishing the tasks based on the natural language conversation, in accordance with some embodiments.

Further, in some embodiments, the system 200 may include a continuous learning unit 802 (as shown in FIG. 8) configured for receiving at least one feedback signal from at least one of a user and an instructor. Further, the continuous learning unit 802 may be configured for training the conversational model based on the at least one feedback signal. Further, the accomplishing of the tasks may be based on the training.

Figure 9:
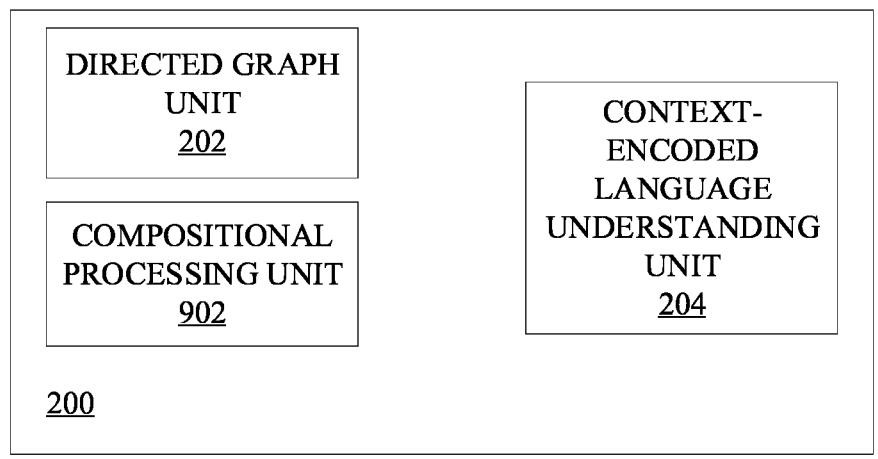
FIG. 9 is a block diagram of the system for facilitating accomplishing the tasks based on the natural language conversation, in accordance with some embodiments.

Further, in some embodiments, the system 200 may include a compositional processing unit 902 (as shown in FIG. 9) configured for processing a plurality of utterances with two basic operations. Further, the two basic operations may include a divide sub-process and a merge sub-process. Further, the divide sub-process divides an utterance of the plurality of utterances into a plurality of sub-phrases. Further, each of the plurality of sub-phrases may be processed separately to generate the plurality of processing results. Further, the merge sub-process merges the plurality of processing results into a consolidated result in a uniform representation. Further, the accomplishing of the tasks may be based on the consolidated result in the uniform representation.

FIG. 3 is a block diagram of the system 200 for facilitating accomplishing the tasks based on the natural language conversation, in accordance with some embodiments.

FIG. 4 is a block diagram of the system 200 for facilitating accomplishing the tasks based on the natural language conversation, in accordance with some embodiments.

FIG. 5 is a block diagram of the system 200 for facilitating accomplishing the tasks based on the natural language conversation, in accordance with some embodiments.

FIG. 6 is a block diagram of the system 200 for facilitating accomplishing the tasks based on the natural language conversation, in accordance with some embodiments.

FIG. 7 is a block diagram of the system 200 for facilitating accomplishing the tasks based on the natural language conversation, in accordance with some embodiments.

FIG. 8 is a block diagram of the system 200 for facilitating accomplishing the tasks based on the natural language conversation, in accordance with some embodiments.

FIG. 9 is a block diagram of the system 200 for facilitating accomplishing the tasks based on the natural language conversation, in accordance with some embodiments.

Figure 10:
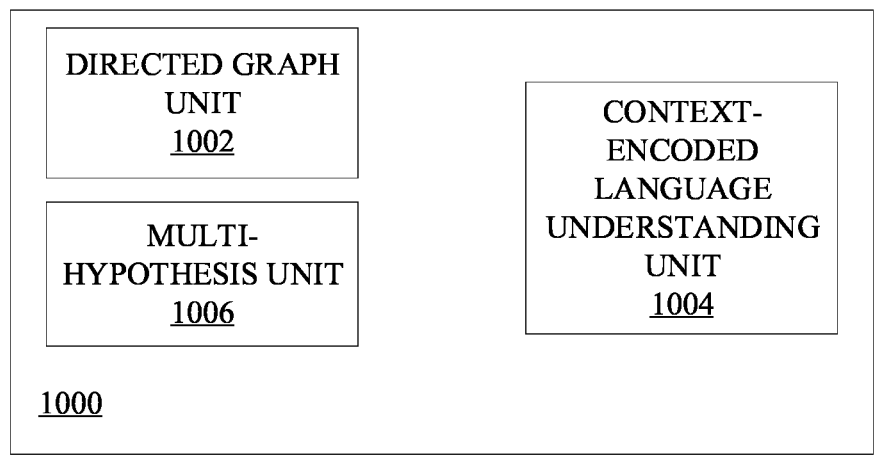
FIG. 10 is a block diagram of a system for facilitating accomplishing tasks based on a natural language conversation, in accordance with some embodiments.

FIG. 10 is a block diagram of a system 1000 for facilitating accomplishing tasks based on a natural language conversation, in accordance with some embodiments. Accordingly, the system 1000 may include a direct graph unit 1002. Further, the direct graph unit 1002 may include a directed graph. Further, the directed graph models a non-linearity of the natural language conversation. Further, the directed graph may include a set of nodes connected by at least one edge. Further, the directed graph represents a conversation model of a specific domain. Further, each node of the set of nodes represents a state associated with a plurality of types. Further, the plurality of types may include an intent, action, and expect. Further, the intent represents a state after a human utterance. Further, the action represents an activity that the system 1000 takes based on a probabilistic assessment of a current state. Further, the expect represents a state after a machine utterance.

Further, the system 1000 may include a context-encoded language understanding unit 1004. Further, the context-encoded language understanding unit 1004 may include a learning unit and an inferring unit. Further, the learning unit may be configured for receiving a plurality of inputs. Further, the plurality of inputs may include a plurality of processing results of a plurality of previous utterances, a plurality of system's previous responses, and a current utterance with at least one of an annotation and contextual information associated with the current utterance. Further, the learning unit may be configured for generating a model based on the plurality of inputs. Further, the inferring unit may be configured for receiving a plurality of inputs. Further, the plurality of inputs may include a plurality of processing results of a plurality of previous utterances, a plurality of system's previous responses, and a current utterance with at least one of an annotation and contextual information associated with the current utterance. Further, the inferring unit may be configured for generating an output based on the plurality of inputs and the model. Further, the output may include a probabilistic prediction on a next state in the conversation model. Further, the conversation model may be configured for accomplishing the tasks based on the probabilistic prediction of the next state.

Further, the system 1000 may include a multi-hypothesis unit 1006 configured for implementing a multi-hypothesis processing method. Further, the multi-hypothesis processing method carries a compositional multi-hypothesis along an entire processing pipeline associated with the system 1000 in order to cope with a probabilistic nature of the natural language conversation. Further, the accomplishing of the tasks may be based on the implementing of the multi-hypothesis processing method. Further, the multi-hypothesis processing method makes a plurality of probabilistic hypotheses on the current state using at least one information that may include the conversational model, a plurality of detected states, and a plurality of inferred states. Further, the accomplishing of the tasks may be based on the plurality of probabilistic hypotheses.

Further, in some embodiments, the direct graph unit 1002 may be configured for modeling the natural language conversation with a set of contexts. Further, the direct graph unit 1002 may be configured for generating the directed graph based on the modeling. Further, the accomplishing of the tasks may be based on the generating of the directed graph.

Figure 11:
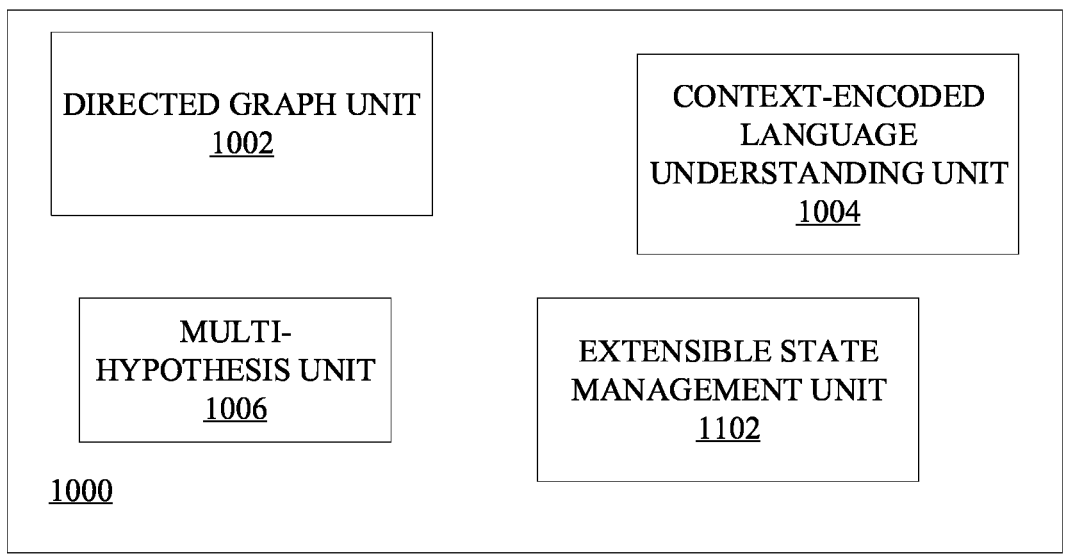
FIG. 11 is a block diagram of the system for facilitating accomplishing the tasks based on the natural language conversation, in accordance with some embodiments.

Further, in some embodiments, the system 1000 may include an extensible state management unit 1102 (as shown in FIG. 11). Further, the extensible state management unit 1102 may include a plurality of detected states and a plurality of inferred states. Further, the plurality of detected states may be configured for storing a plurality of processing results of a plurality of utterances parsing. Further, the plurality of utterances drives the natural language conversation. Further, the plurality of inferred states may be configured for storing a plurality of states from the plurality of inputs that may include the plurality of detected states and a plurality of hidden states. Further, the accomplishing of the tasks may be based on the storing of the plurality of processing results and the storing of the plurality of states.

Figure 12:
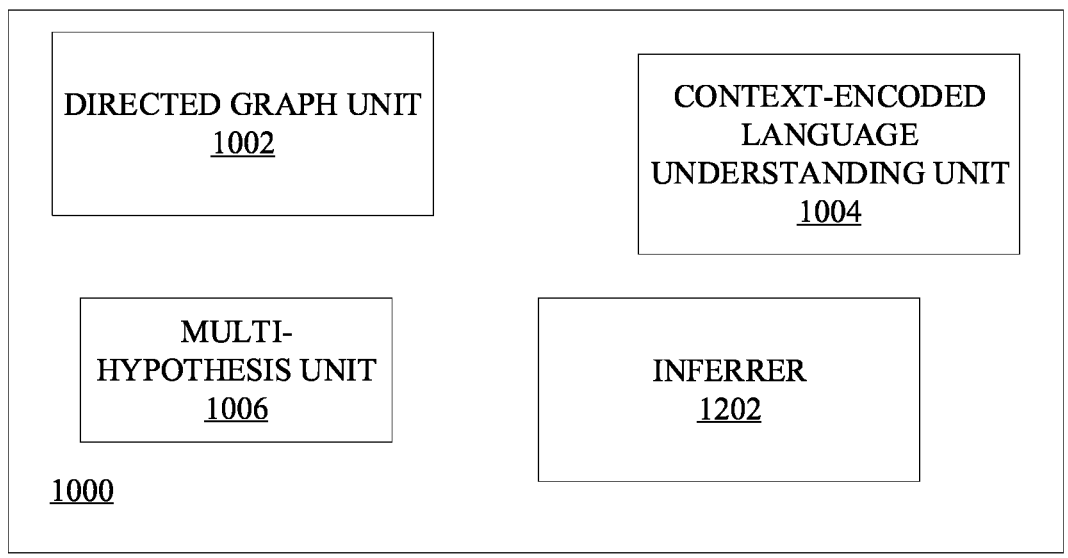
FIG. 12 is a block diagram of the system for facilitating accomplishing the tasks based on the natural language conversation, in accordance with some embodiments.

Further, in some embodiments, the system 1000 may include an inferrer 1202 (as shown in FIG. 12) configured to be added to the extensible state management unit 1102. Further, the inferrer 1202 may be a plug-in-module. Further, the inferrer 1202 may be configured for generating the plurality of inferred states. Further, the accomplishing of the tasks may be based on the generating the plurality of inferred states.

Further, in some embodiments, each of the plurality of detected states and the plurality of inferred states may include a plurality of representations representing each of the plurality of detected states and the plurality of inferred states in a semantic frame format.

Figure 13:
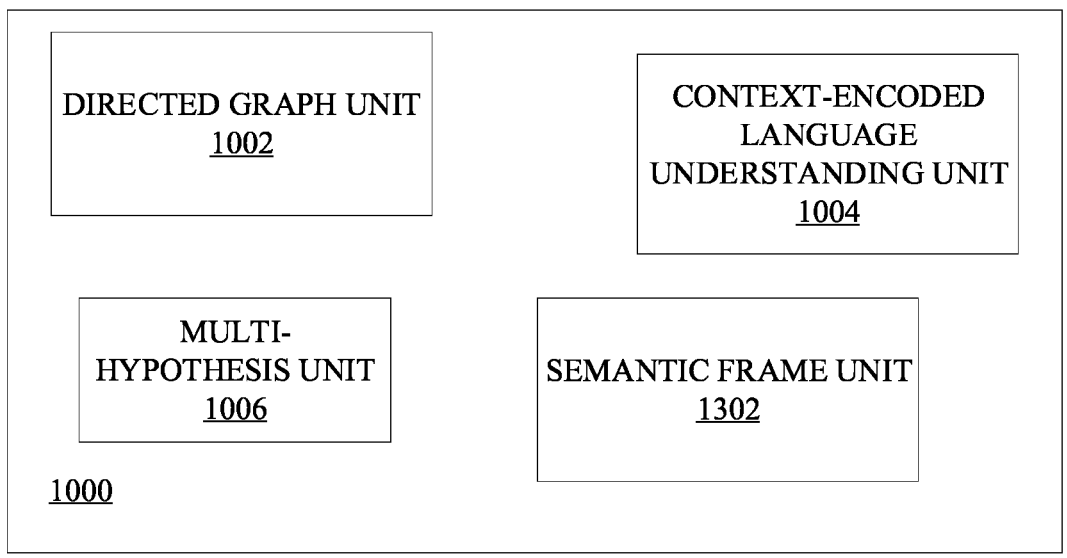
FIG. 13 is a block diagram of the system for facilitating accomplishing the tasks based on the natural language conversation, in accordance with some embodiments.

Further, in some embodiments, the system 1000 may include a semantic frame unit 1302 (as shown in FIG. 13). Further, the semantic frame unit 1302 may include a plurality of structured representations of a plurality of processed results. Further, the plurality of structured representations may include a distributed representation, a graph representation, and a tree representation. Further, the plurality of structured representations carries a semantic meaning. Further, the semantic meaning may be expressed in a numeric distance calculated from the distributed representation. Further, the accomplishing of the tasks may be based on the semantic meaning.

Further, in some embodiments, the semantic meaning may be expressed in a structural distance calculated from at least one of the graph representation and the tree representation.

FIG. 11 is a block diagram of the system 1000 for facilitating accomplishing the tasks based on the natural language conversation, in accordance with some embodiments.

FIG. 12 is a block diagram of the system 1000 for facilitating accomplishing the tasks based on the natural language conversation, in accordance with some embodiments.

FIG. 13 is a block diagram of the system 1000 for facilitating accomplishing the tasks based on the natural language conversation, in accordance with some embodiments.

Figure 14:
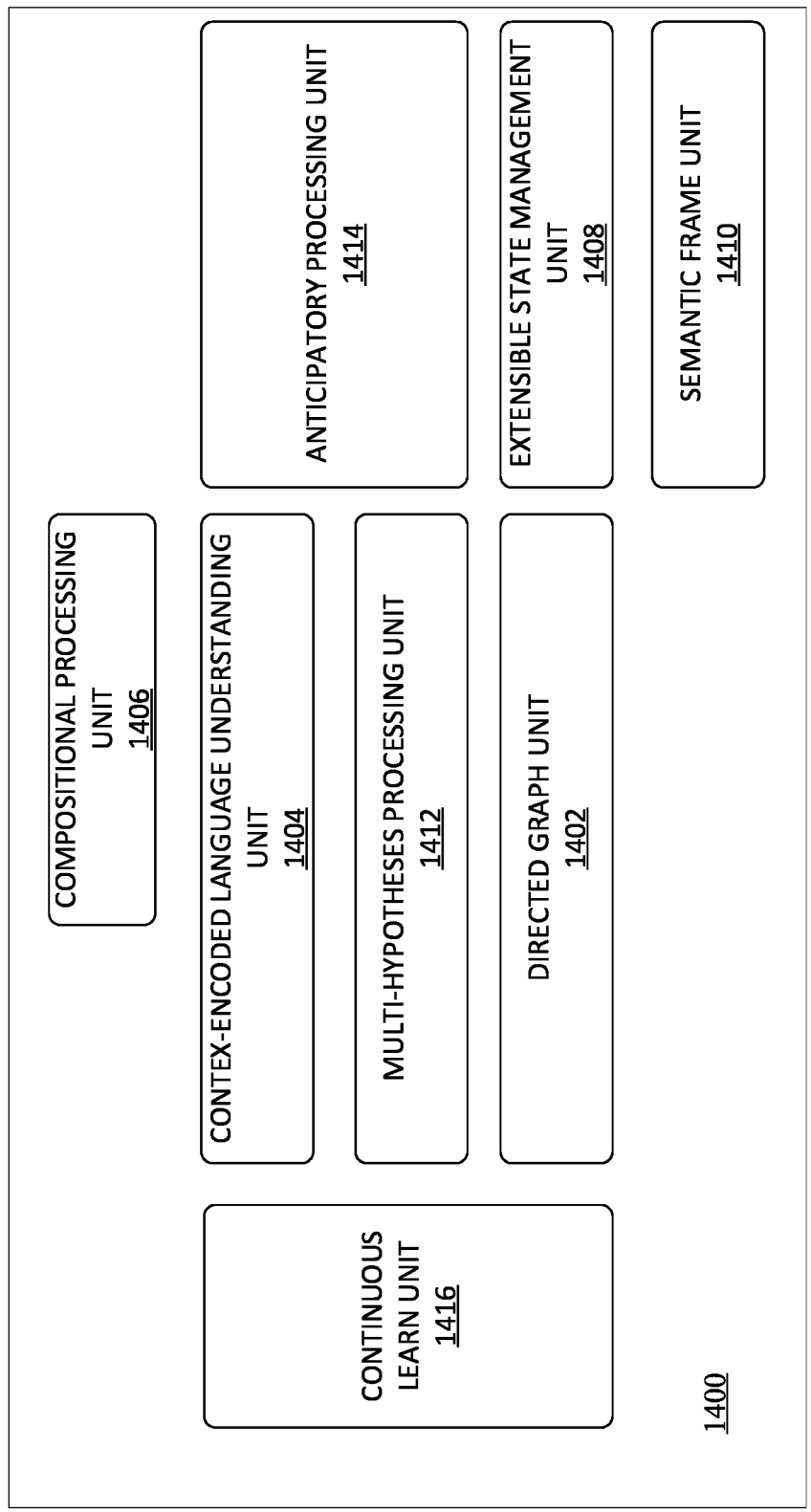
FIG. 14 is a block diagram of a system architecture of a system for training and processing a conversation, in accordance with some embodiments.

FIG. 14 is a block diagram of a system architecture of a system 1400 for training and processing a conversation, in accordance with some embodiments. Accordingly, the system 1400 may include a directed graph unit 1402 that may be used to model natural language conversation with a set of contexts, the representation of a graph may either be learned from natural conversation data or manually inputted as prior domain knowledge. Further, a Directed Graph may model the non-linearity of natural language conversation. Further, the system 1400 may include a context-encoded language understanding unit 1404 (or context-encoded language understanding algorithm unit) that learns the semantic meaning of natural language from not only the utterance but also the contextual information that includes sequential context, inter-speaker context, intra-speaker context, and other contextual information. Further, the system 1400 may include a compositional processing unit 1406 that iteratively processes sub-phrases of the utterance. Further, the system 1400 may include an extensible state management unit 1408 that may detect, manage, and infer states for conversation. Further, the system 1400 may include a semantic frame unit 1410 that may construct extracted information into persistent memory. Further, the system 1400 may include a multi-hypothesis processing unit 1412 that carries multiple hypotheses on the current state from probabilistic results generated from components along the processing pipeline and the state information accumulated during the conversation. Further, the system 1400 may include an anticipatory processing unit 1414 that may be used to predict the future interactions based on existing context information and graph-based conversational model. Further, the system 1400 may be associated with a continuous learning unit 1416 that takes feedback (or signal) from instructor and user to continuously refine the model for better results in the future.

Figure 15:
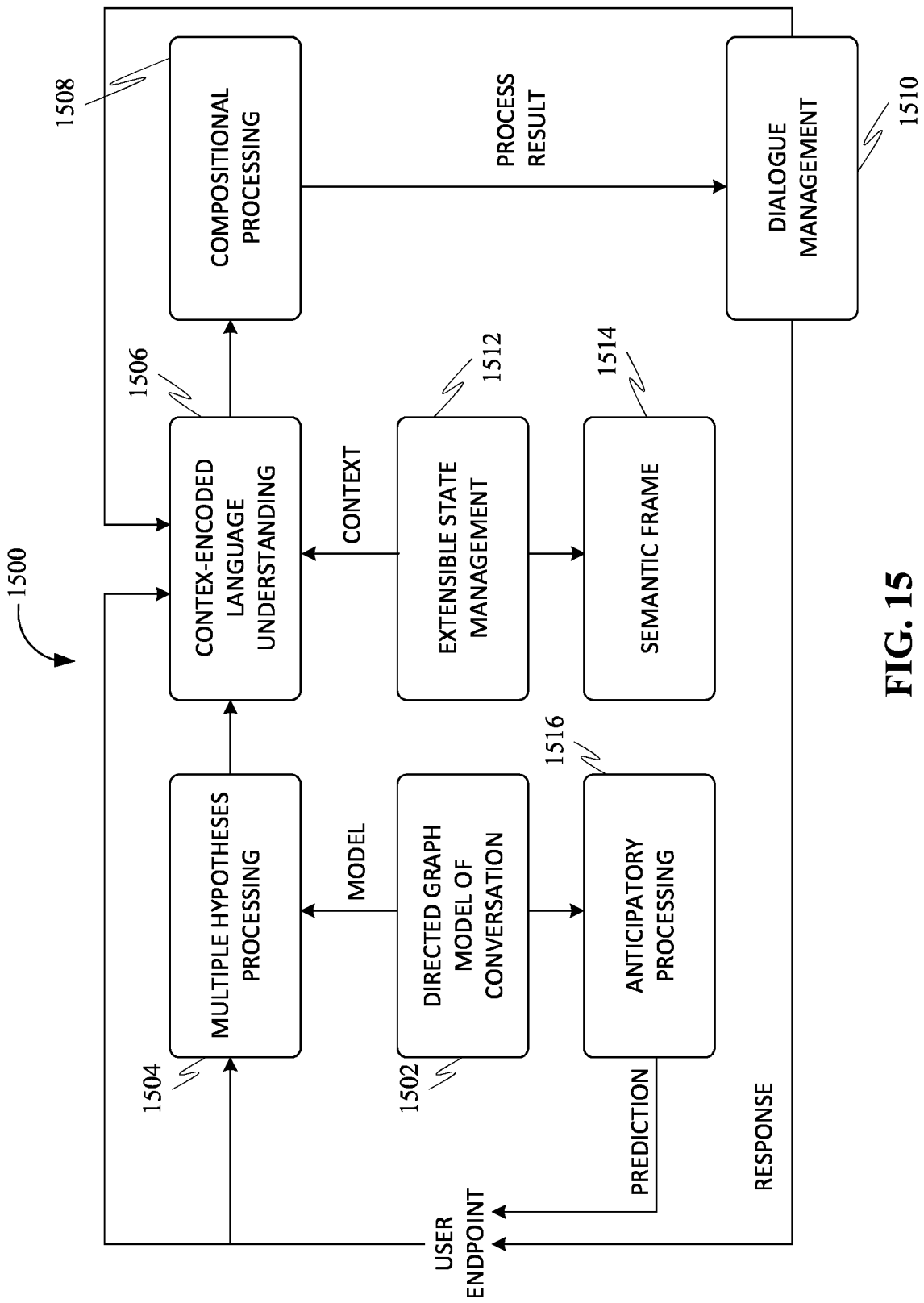
FIG. 15 is a flow diagram of a method for processing the conversation and generating the response, in accordance with some embodiments.

FIG. 15 is a flow diagram of a method 1500 for processing the conversation and generating the response, in accordance with some embodiments. Accordingly, at 1502, the method 1500 may include a directed graph model of conversation. Further, at 1504, the method 1500 may include multiple hypothesis processing. Further, at 1506, the method 1500 may include context encoded language understanding. Further, at 1508, the method 1500 may include compositional processing. Further, at 1510, the method 1500 may include dialogue management. Further, at 1512, the method 1500 may include extensible state management. Further, after 1512, at 1514, the method 1500 may include a semantic frame. Further, after 1502, at 1516, the method 1500 may include anticipatory processing.

Figure 16:
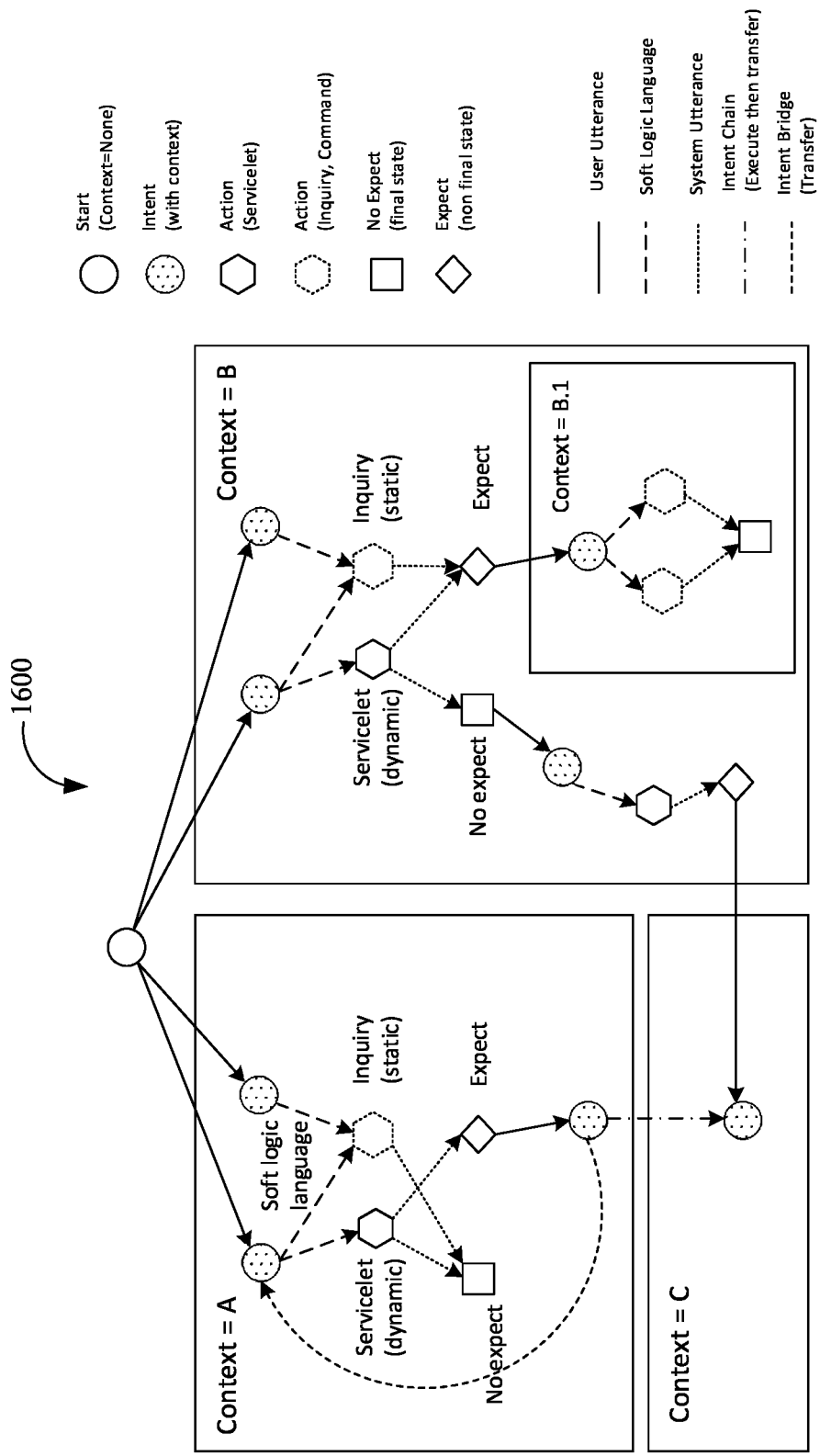
FIG. 16 is a graphical representation of the conversational model, in accordance with some embodiments.

FIG. 16 is a graphical representation 1600 of the conversational model, in accordance with some embodiments.

Figure 17:
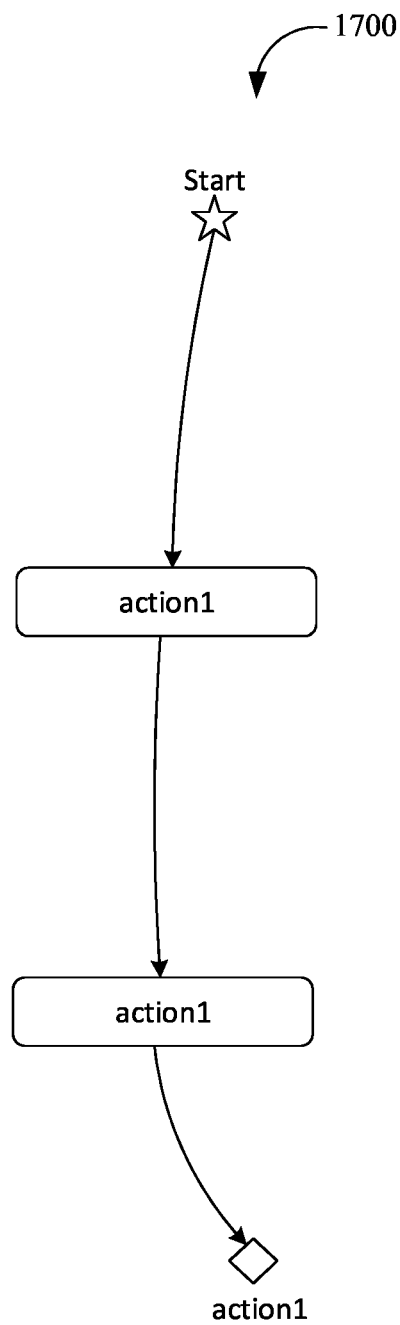
FIG. 17 is a graphical representation of the conversational model, in accordance with some embodiments.

FIG. 17 is a graphical representation 1700 of the conversational model, in accordance with some embodiments.

Figure 18:
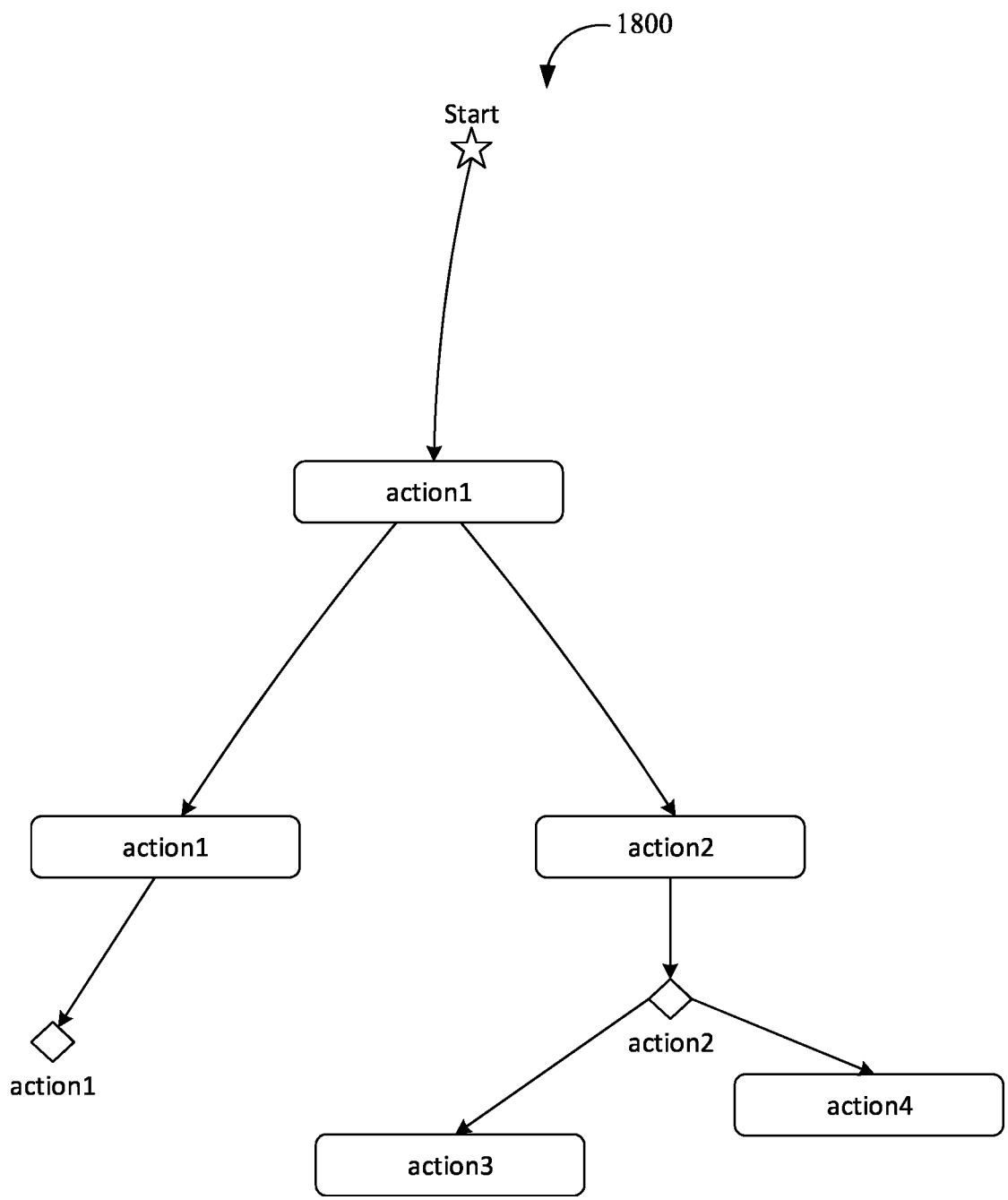
FIG. 18 is a graphical representation of the conversational model, in accordance with some embodiments.

FIG. 18 is a graphical representation 1800 of the conversational model, in accordance with some embodiments.

Figure 19:
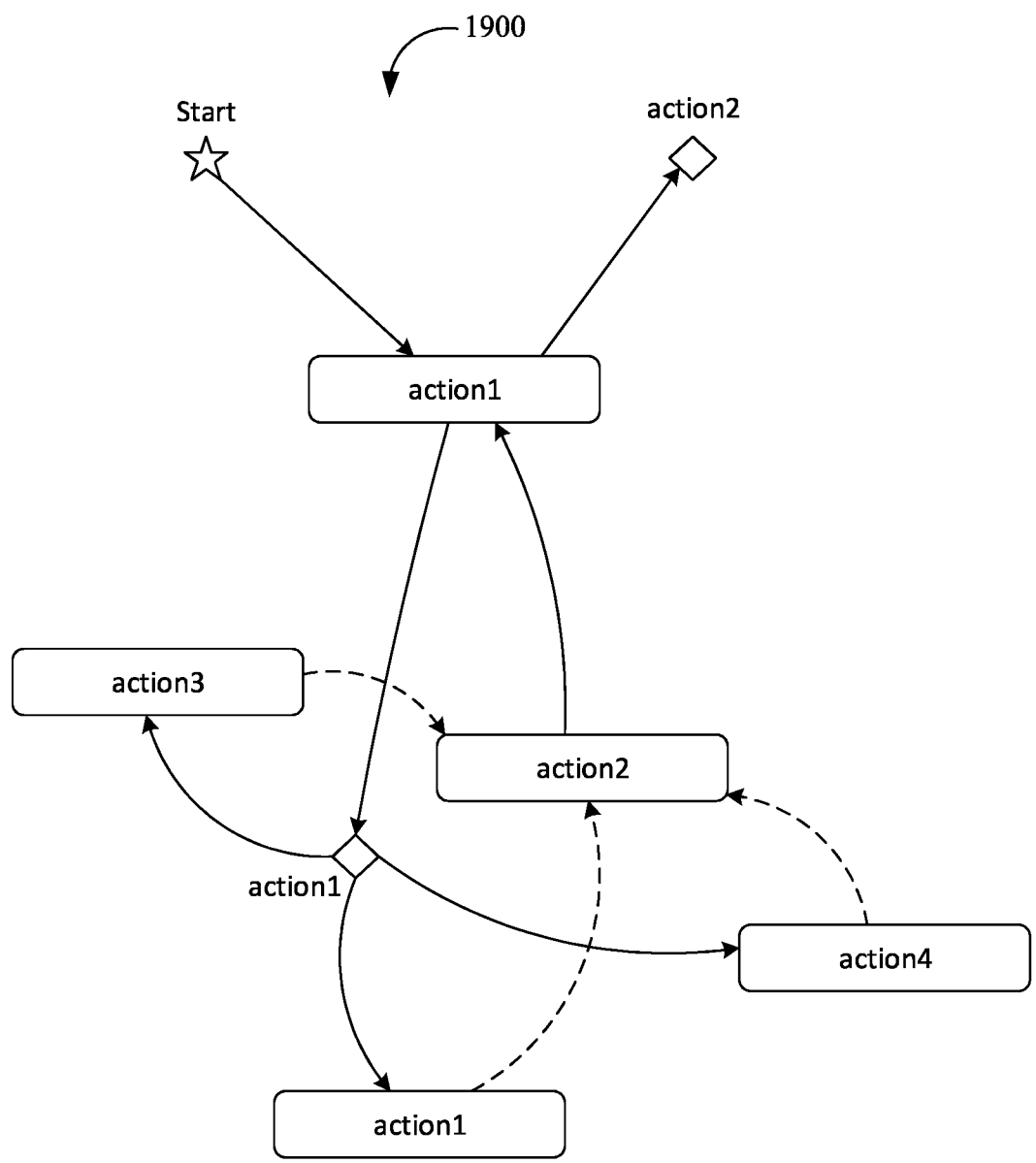
FIG. 19 is a graphical representation of the conversational model, in accordance with some embodiments.

FIG. 19 is a graphical representation 1900 of the conversational model, in accordance with some embodiments.

Figure 20:
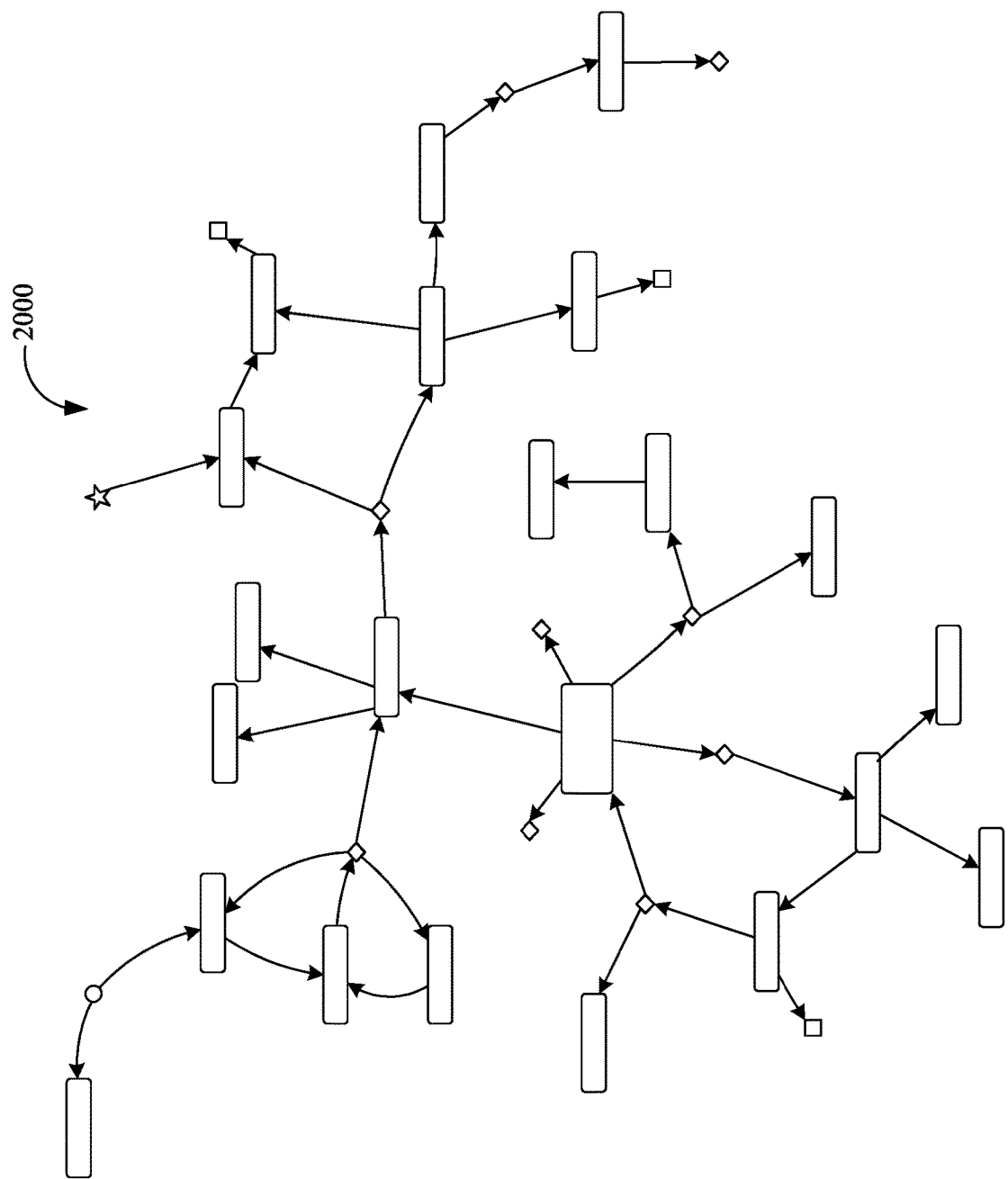
FIG. 20 is a graphical representation of the conversational model, in accordance with some embodiments.

FIG. 20 is a graphical representation 2000 of the conversational model, in accordance with some embodiments.

Figure 21:
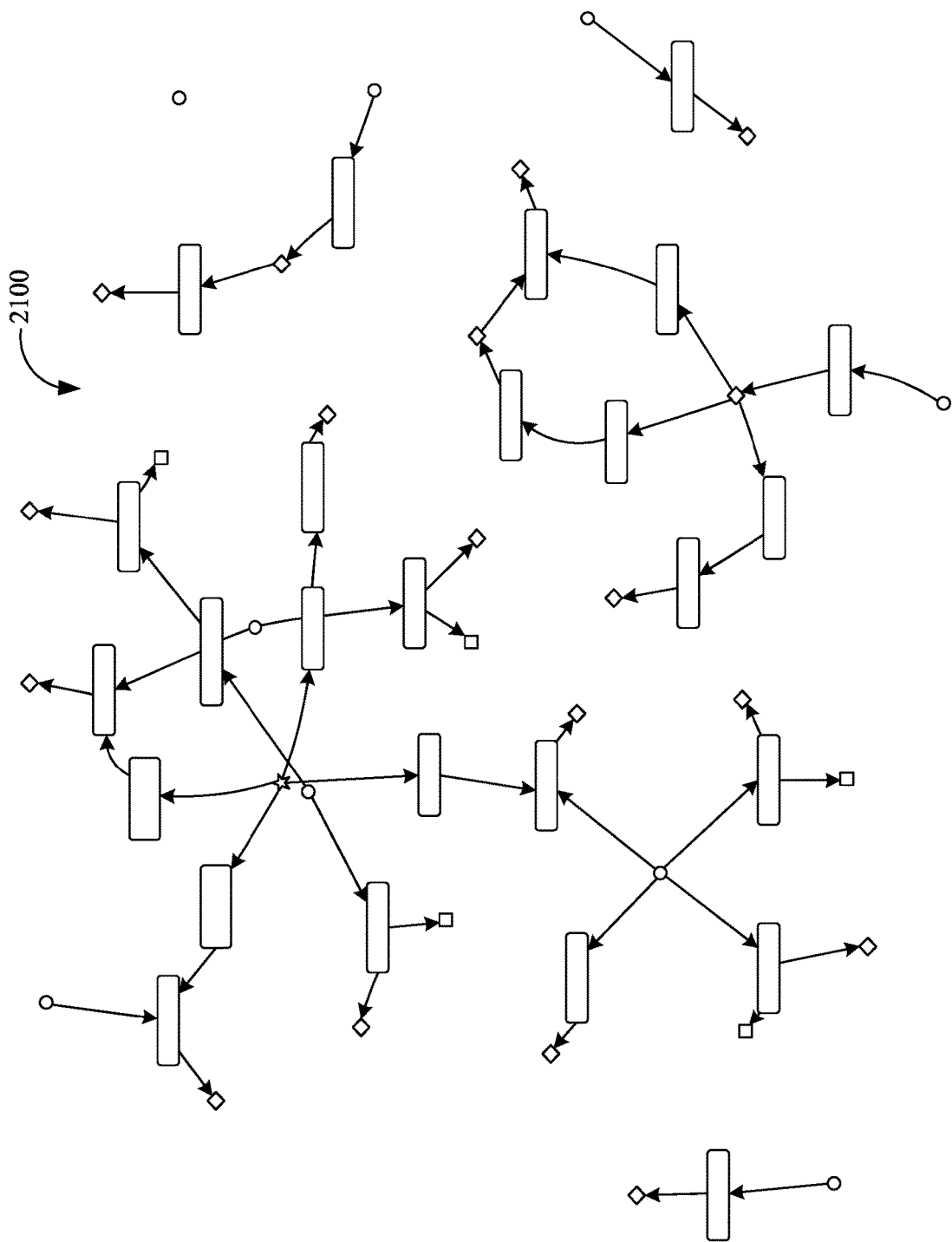
FIG. 21 is a graphical representation of the conversational model, in accordance with some embodiments.

FIG. 21 is a graphical representation 2100 of the conversational model, in accordance with some embodiments.

Figure 22:
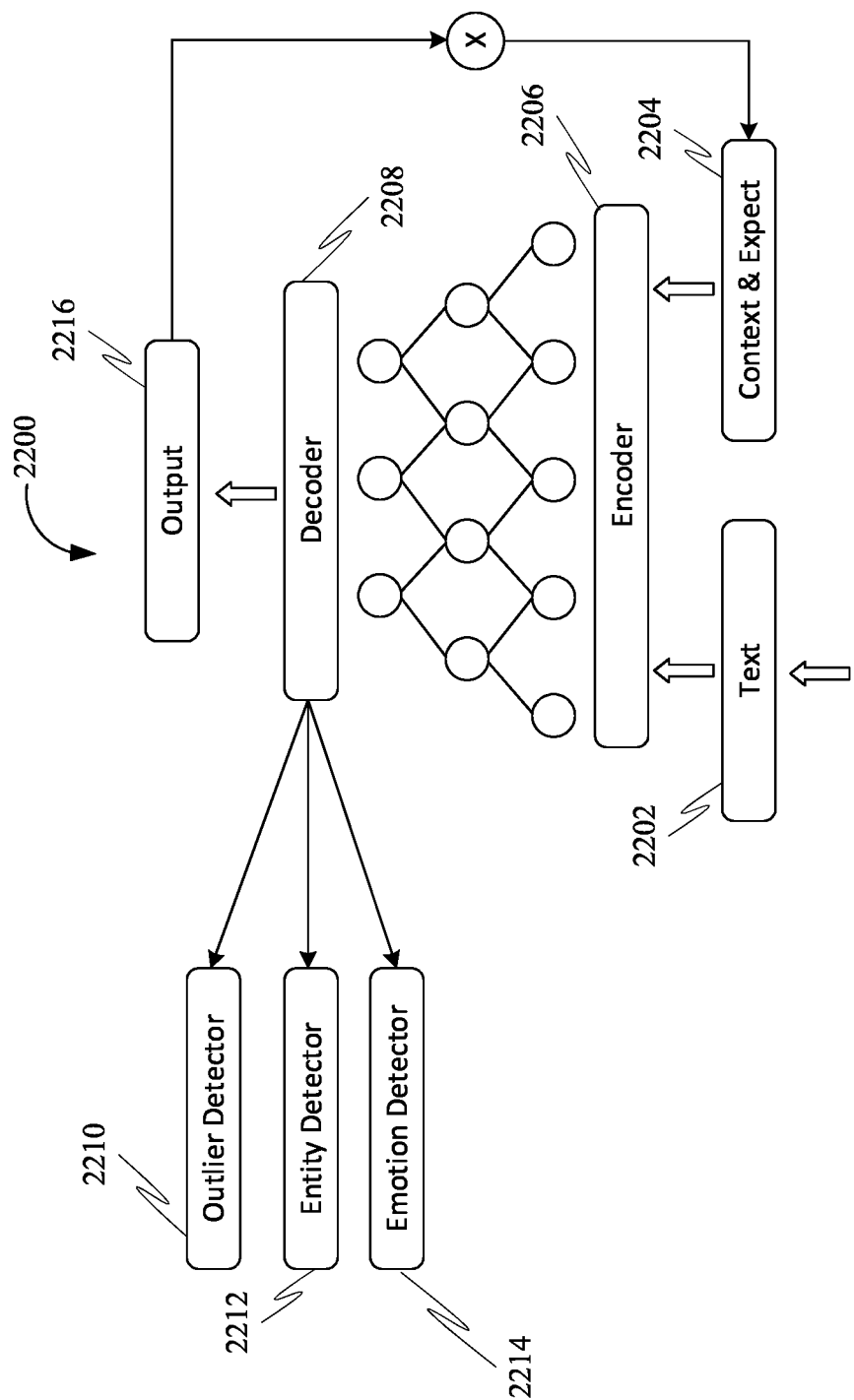
FIG. 22 is a flow diagram of a method for training a model associated with the context encoded NLU, in accordance with some embodiments.

FIG. 22 is a flow diagram of a method 2200 for training a model associated with the context encoded NLU, in accordance with some embodiments. Accordingly, at 2202, the method 2200 may include receiving text. Further, at 2204, the method 2200 may include receiving context and expect. Further, at 2206, the method 2200 may include encoding using an encoder. Further, at 2208, the method 2200 may include decoding using a decoder. Further, the decoder may include an outlier detector 2210, an entity detector 2212, and an emotion detector 2214. Further, at 2216, the method 2200 may include an output.

Figure 23:
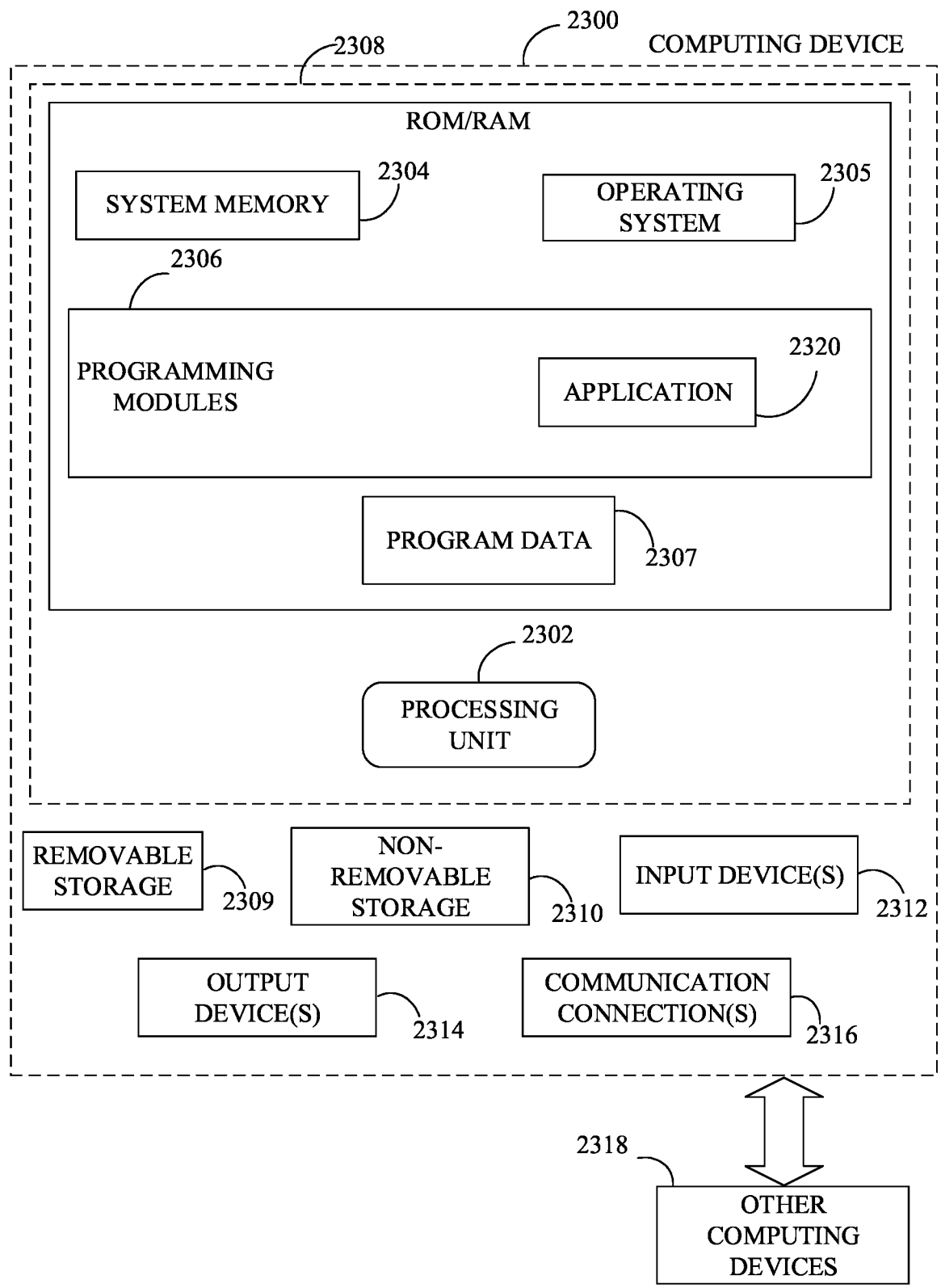
FIG. 23 is a block diagram of a computing device for implementing the methods disclosed herein, in accordance with some embodiments.

With reference to FIG. 23, a system consistent with an embodiment of the disclosure may include a computing device or cloud service, such as computing device 2300. In a basic configuration, computing device 2300 may include at least one processing unit 2302 and a system memory 2304. Depending on the configuration and type of computing device, system memory 2304 may comprise, but is not limited to, volatile (e.g. random-access memory (RAM)), non-volatile (e.g. read-only memory (ROM)), flash memory, or any combination. System memory 2304 may include operating system 2305, one or more programming modules 2306, and may include a program data 2307. Operating system 2305, for example, may be suitable for controlling computing device 2300's operation. In one embodiment, programming modules 2306 may include image-processing module, machine learning module. Furthermore, embodiments of the disclosure may be practiced in conjunction with a graphics library, other operating systems, or any other application program and is not limited to any particular application or system. This basic configuration is illustrated in FIG. 23 by those components within a dashed line 2308.

Computing device 2300 may have additional features or functionality. For example, computing device 2300 may also include additional data storage devices (removable and/or non-removable) such as, for example, magnetic disks, optical disks, or tape. Such additional storage is illustrated in FIG. 23 by a removable storage 2309 and a non-removable storage 2310. Computer storage media may include volatile and non-volatile, removable and non-removable media implemented in any method or technology for storage of information, such as computer-readable instructions, data structures, program modules, or other data. System memory 2304, removable storage 2309, and non-removable storage 2310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2300. Any such computer storage media may be part of device 2300. Computing device 2300 may also have input device(s) 2312 such as a keyboard, a mouse, a pen, a sound input device, a touch input device, a location sensor, a camera, a biometric sensor, etc. Output device(s) 2314 such as a display, speakers, a printer, etc. may also be included. The aforementioned devices are examples and others may be used.

Computing device 2300 may also contain a communication connection 2316 that may allow device 2300 to communicate with other computing devices 2318, such as over a network in a distributed computing environment, for example, an intranet or the Internet. Communication connection 2316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 2304, including operating system 2305. While executing on processing unit 2302, programming modules 2306 (e.g., application 2320) may perform processes including, for example, one or more stages of methods, algorithms, systems, applications, servers, databases as described above. The aforementioned process is an example, and processing unit 2302 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A system for facilitating accomplishing tasks based on a natural language conversation, the system comprising:
  a direct graph unit comprising a directed graph, wherein the directed graph models a non-linearity of the natural language conversation, wherein the directed graph comprises a set of nodes connected by at least one edge, wherein the directed graph represents a conversation model of a specific domain, wherein each node of the set of nodes represents a state associated with a plurality of types, wherein the plurality of types comprises an intent, action, and expect, wherein the intent represents a state after a human utterance, wherein the action represents an activity that the system take based on a probabilistic assessment of a current state, wherein the expect represents a state after a machine utterance; and
  a context-encoded language understanding unit comprising a learning unit and an inferring unit, wherein the learning unit is configured for:
    receiving a plurality of inputs, wherein the plurality of inputs comprises a plurality of processing results of a plurality of previous utterances, a plurality of system's previous responses, and a current utterance with at least one of an annotation and contextual information associated with the current utterance; and
    generating a model based on the plurality of inputs, wherein the inferring unit is configured for:
    receiving a plurality of inputs, wherein the plurality of inputs comprises a plurality of processing results of a plurality of previous utterances, a plurality of system's previous responses, and a current utterance with at least one of an annotation and contextual information associated with the current utterance; and
    generating an output based on the plurality of inputs and the model, wherein the output comprises a probabilistic prediction on a next state in the conversation model, wherein the conversation model is configured for accomplishing the tasks based on the probabilistic prediction of the next state.

2. The system of claim 1, wherein the direct graph unit is configured for:
  modeling the natural language conversation with a set of contexts; and
  generating the directed graph based on the modeling, wherein the accomplishing of the tasks is further based on the generating of the directed graph.

3. The system of claim 1 further comprising an extensible state management unit comprising a plurality of detected states and a plurality of inferred states, wherein the plurality of detected states is configured for storing a plurality of processing results of a plurality of utterances parsing, wherein the plurality of utterances drives the natural language conversation, wherein the plurality of inferred states is configured for storing a plurality of states from the plurality of inputs comprising the plurality of detected states and a plurality of hidden states, wherein the accomplishing of the tasks is further based on the storing of the plurality of processing results and the storing of the plurality of states.

4. The system of claim 3 further comprising an inferrer configured to be added to the extensible state management unit, wherein the inferrer is a plug-in-module, wherein the inferrer is configured for generating the plurality of inferred states, wherein the accomplishing of the tasks is further based on the generating the plurality of inferred states.

5. The system of claim 3, wherein each of the plurality of detected states and the plurality of inferred states comprises a plurality of representations representing each of the plurality of detected states and the plurality of inferred states in a semantic frame format.

6. The system of claim 1 further comprising a semantic frame unit comprising a plurality of structured representations of a plurality of processed results, wherein the plurality of structured representations comprises a distributed representation, a graph representation, and a tree representation, wherein the plurality of structured representations carries a semantic meaning, wherein the semantic meaning is expressed in a numeric distance calculated from the distributed representation, wherein the accomplishing of the tasks is further based on the semantic meaning.

7. The system of claim 6, wherein the semantic meaning is expressed in a structural distance calculated from at least one of the graph representation and the tree representation.

8. The system of claim 6, wherein the plurality of structured representations is configured to be used by a plurality of units in at least one of reasoning and inferring a plurality of states associated with the natural language conversation, identifying at least one of at least one appropriate response and at least one appropriate action, and executing a plurality of identified actions with proper parameters, wherein the accomplishing of the tasks is further based on the at least one of the reasoning and the inferring, the identifying, and the executing.

9. The system of claim 1 further comprising a multi-hypothesis unit configured for implementing a multi-hypothesis processing method, wherein the multi-hypothesis processing method carries a compositional multi-hypothesis along an entire processing pipeline associated with the system in order to cope with a probabilistic nature of the natural language conversation, wherein the accomplishing of the tasks is further based on the implementing of the multi-hypothesis processing method.

10. The system of claim 9, wherein the multi-hypothesis processing method makes a plurality of probabilistic hypotheses on the current state using at least one information comprising the conversational model, a plurality of detected states, and a plurality of inferred states, wherein the accomplishing of the tasks is further based on the plurality of probabilistic hypotheses.

11. The system of claim 1 further comprising an anticipatory processing unit configured for generating the probabilistic prediction on a plurality of next interactions using the conversation model, historical data, and a plurality of hypotheses of the current state, wherein the accomplishing of the tasks is further based on the generating of the probabilistic prediction on the plurality of next interactions.

12. The system of claim 1 further comprising a continuous learning unit configured for:
receiving at least one feedback signal from at least one of a user and an instructor; and
training the conversational model based on the at least one feedback signal, wherein the accomplishing of the tasks is further based on the training.

13. The system of claim 1 further comprising a compositional processing unit configured for processing a plurality of utterances with two basic operations, wherein the two basic operations comprises a divide sub-process and a merge sub-process, wherein the divide sub-process divides an utterance of the plurality of utterances into a plurality of sub-phrases, wherein each of the plurality of sub-phrases is processed separately to generate the plurality of processing results, wherein the merge sub-process merges the plurality of processing results into a consolidated result in a uniform representation, wherein the accomplishing of the tasks is further based on the consolidated result in the uniform representation.

14. A system for facilitating accomplishing tasks based on a natural language conversation, the system comprising:
a direct graph unit comprising a directed graph, wherein the directed graph models a non-linearity of the natural language conversation, wherein the directed graph comprises a set of nodes connected by at least one edge, wherein the directed graph represents a conversation model of a specific domain, wherein each node of the set of nodes represents a state associated with a plurality of types, wherein the plurality of types comprises an intent, action, and expect, wherein the intent represents a state after a human utterance, wherein the action represents an activity that the system take based on a probabilistic assessment of a current state, wherein the expect represents a state after a machine utterance;
a context-encoded language understanding unit comprising a learning unit and an inferring unit, wherein the learning unit is configured for:
receiving a plurality of inputs, wherein the plurality of inputs comprises a plurality of processing results of a plurality of previous utterances, a plurality of system's previous responses, and a current utterance with at least one of an annotation and contextual information associated with the current utterance;
generating a model based on the plurality of inputs, wherein the inferring unit is configured for:
receiving a plurality of inputs, wherein the plurality of inputs comprises a plurality of processing results of a plurality of previous utterances, a plurality of system's previous responses, and a current utterance with at least one of an annotation and contextual information associated with the current utterance; and
generating an output based on the plurality of inputs and the model, wherein the output comprises a probabilistic prediction on a next state in the conversation model, wherein the conversation model is configured for accomplishing the tasks based on the probabilistic prediction of the next state; and
a multi-hypothesis unit configured for implementing a multi-hypothesis processing method, wherein the multi-hypothesis processing method carries a compositional multi-hypothesis along an entire processing pipeline associated with the system in order to cope with a probabilistic nature of the natural language conversation, wherein the accomplishing of the tasks is further based on the implementing of the multi-hypothesis processing method, wherein the multi-hypothesis processing method makes a plurality of probabilistic hypotheses on the current state using at least one information comprising the conversational model, a plurality of detected states, and a plurality of inferred states, wherein the accomplishing of the tasks is further based on the plurality of probabilistic hypotheses.

15. The system of claim 14, wherein the direct graph unit is configured for:
modeling the natural language conversation with a set of contexts; and
generating the directed graph based on the modeling, wherein the accomplishing of the tasks is further based on the generating of the directed graph.

16. The system of claim 14 further comprising an extensible state management unit comprising a plurality of detected states and a plurality of inferred states, wherein the plurality of detected states is configured for storing a plurality of processing results of a plurality of utterances parsing, wherein the plurality of utterances drives the natural language conversation, wherein the plurality of inferred states is configured for storing a plurality of states from the plurality of inputs comprising the plurality of detected states and a plurality of hidden states, wherein the accomplishing of the tasks is further based on the storing of the plurality of processing results and the storing of the plurality of states.

17. The system of claim 16 further comprising an inferrer configured to be added to the extensible state management unit, wherein the inferrer is a plug-in-module, wherein the inferrer is configured for generating the plurality of inferred states, wherein the accomplishing of the tasks is further based on the generating the plurality of inferred states.

18. The system of claim 16, wherein each of the plurality of detected states and the plurality of inferred states comprises a plurality of representations representing each of the plurality of detected states and the plurality of inferred states in a semantic frame format.

19. The system of claim 14 further comprising a semantic frame unit comprising a plurality of structured representations of a plurality of processed results, wherein the plurality of structured representations comprises a distributed representation, a graph representation, and a tree representation, wherein the plurality of structured representations carries a semantic meaning, wherein the semantic meaning is expressed in a numeric distance calculated from the distributed representation, wherein the accomplishing of the tasks is further based on the semantic meaning.

20. The system of claim 19, wherein the semantic meaning is expressed in a structural distance calculated from at least one of the graph representation and the tree representation.

* * * * *